United States Patent [19]
Colson et al.

[11] Patent Number: 5,797,442
[45] Date of Patent: Aug. 25, 1998

[54] VANE FOR AN ARCHITECTURAL COVERING AND METHOD OF MAKING SAME

[75] Inventors: Wendell B. Colson; Paul G. Swiszcz, both of Boulder; James M. Anthony, Denver, all of Colo.

[73] Assignee: Hunter Douglas Inc., Upper Saddle River, N.J.

[21] Appl. No.: 639,889

[22] Filed: Apr. 24, 1996

Related U.S. Application Data

[63] Continuation-in-part of Ser. No. 437,959, May 10, 1995.
[51] Int. Cl.$^6$ .......................................... E06B 9/36
[52] U.S. Cl. .......................... 160/236; 160/900; 160/330
[58] Field of Search .................................. 160/236, 900, 160/330, 348, 168.1 V, 176.1 V, 84.05, 84.01

[56] References Cited

U.S. PATENT DOCUMENTS

| | | |
|---|---|---|
| 2,169,873 | 8/1939 | Clark, Jr. . |
| 2,326,454 | 8/1943 | Gentile . |
| 3,844,330 | 10/1974 | Hyman . |
| 3,851,699 | 12/1974 | Shapiro . |
| 3,946,789 | 3/1976 | Ronkolz-Tolle . |
| 4,352,384 | 10/1982 | McCoy, Jr. . |
| 4,434,834 | 3/1984 | Ennes . |
| 4,466,476 | 8/1984 | Fairbanks ........................ 160/330 |
| 4,519,435 | 5/1985 | Stier . |
| 4,535,828 | 8/1985 | Brockhaus . |
| 4,846,243 | 7/1989 | Schneider . |
| 4,893,667 | 1/1990 | Dunn . |
| 4,911,220 | 3/1990 | Hiller . |
| 4,930,562 | 6/1990 | Goodman . |
| 5,012,552 | 5/1991 | Wulf . |
| 5,101,876 | 4/1992 | Zak . |
| 5,141,042 | 8/1992 | Schwaegerle . |
| 5,196,000 | 3/1993 | Clear et al. . |
| 5,203,394 | 4/1993 | Halley . |
| 5,255,940 | 10/1993 | Kornblum et al. . |
| 5,271,447 | 12/1993 | Aronovich . |
| 5,297,607 | 3/1994 | Beauchamp . |
| 5,358,024 | 10/1994 | Schwaegerle . |

FOREIGN PATENT DOCUMENTS

| | | |
|---|---|---|
| 387133 | of 0000 | Canada . |
| 288937 | of 0000 | European Pat. Off. . |
| 469695A | of 0000 | European Pat. Off. . |
| 2920323 | of 0000 | Germany . |
| 3207850 | of 0000 | Germany . |
| 3312988 | of 0000 | Germany . |
| 9001429 | of 0000 | Germany . |
| 837171 | 7/1949 | Germany . |
| 2644354 | 8/1978 | Germany . |
| 2275074 | of 0000 | United Kingdom . |
| 632832 | of 0000 | United Kingdom . |

*Primary Examiner*—Blair Johnson
*Attorney, Agent, or Firm*—Dorsey & Whitney LLP

[57] ABSTRACT

A vane for an architectural covering, such as of the type used in a window openings, is designed for vertical suspension so as to resist twisting along its length. The vane is constructed in a tubular configuration and may have one or more internal hollow cells. The external configuration of the vane may simulate an air foil or have other related configurations. The vanes are preferably made of a material having diagonal, dimensional stability or memory, i.e. the ability to resist stretching in a direction diagonal to the length or width of the material. A reinforcing strip can be inserted into an open end of the vane to provide a positive and durable attachment for suspending the vane from an operating system.

35 Claims, 17 Drawing Sheets

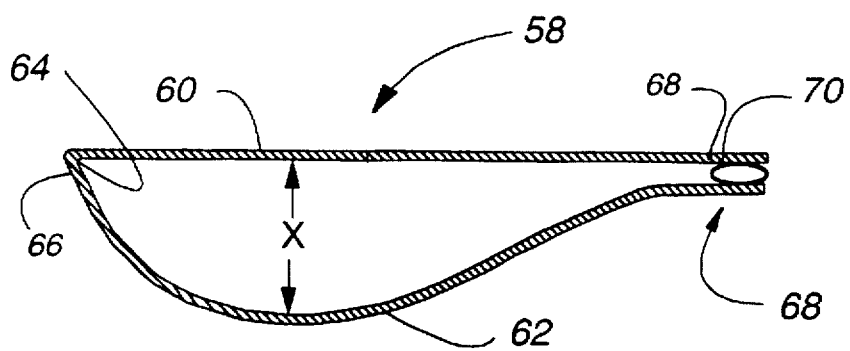
FIG. 7
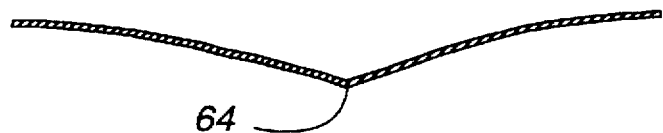
FIG. 8
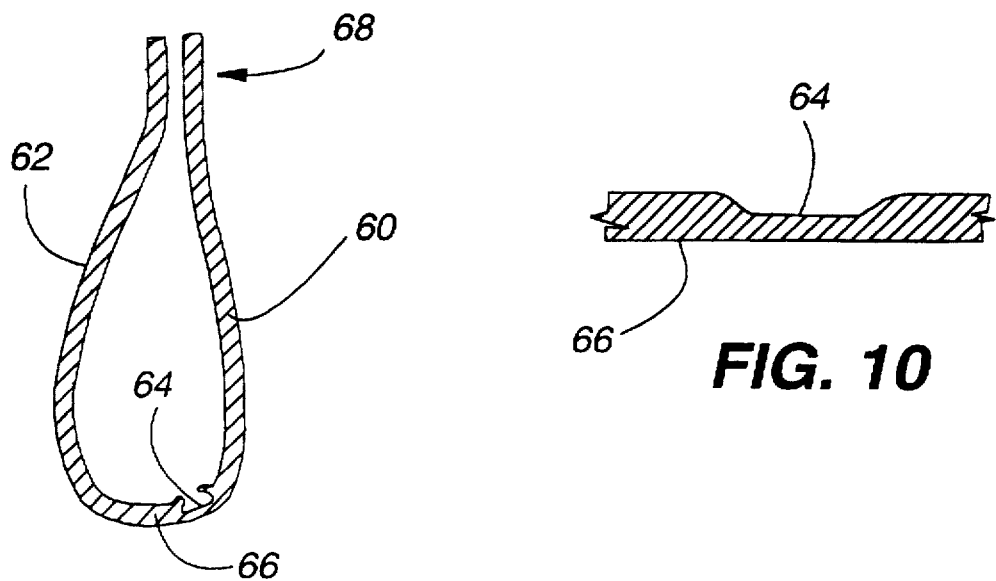
FIG. 9
FIG. 10

SINGLE PLY FABRIC STRIP

| ANGLE (DEGREES) | TORQUE INDEX FORCE (GRAMS) |
|---|---|
| 0 | 0 |
| 30 | 1 |
| 60 | 2 |
| 90 | 3 |

DOUBLE PLY FABRIC STRIP

| ANGLE (DEGREES) | TORQUE INDEX FORCE (GRAMS) |
|---|---|
| 0 | 0 |
| 41 | 1 |
| 50 | 2 |
| 65 | 3 |
| 75 | 4 |
| 81 | 5 |
| 90 | 6 |

TUBULAR VANE OF PRESENT INVENTION

| ANGLE (DEGREES) | TORQUE INDEX FORCE (GRAMS) |
|---|---|
| 0 | 0 |
| 5 | 10 |
| 10 | 24 |
| 15 | 42 |
| 20 | 52 |
| 25 | 54 |
| 30 | 56 |
| 35 | 54 |
| 40 | 56 |
| 45 | 59 |
| 50 | 60 |
| 55 | 57 |
| 60 | 60 |
| 65 | 53 |

*Fig. 26*

FABRIC; (WITHOUT DIAGONAL DIMENSIONAL STABILITY)
WOVEN TUBULAR VANE

| ANGLE (DEGREES) | TORQUE INDEX FORCE (GRAMS) |
|---|---|
| 0 | 0 |
| 38 | 1 |
| 49 | 2 |
| 92 | 3 |

FABRIC; (WITH DIAGONAL DIMENSIONAL STABILITY)
KNIT TUBULAR VANE

| ANGLE (DEGREES) | TORQUE INDEX FORCE (GRAMS) |
|---|---|
| 0 | 0 |
| 2 | 2 |
| 10 | 10 |
| 15 | 14 |
| 20 | 20 |
| 25 | 23 |
| 30 | 24 |
| 35 | 27 |
| 40 | 27 |
| 45 | 26 |
| 50 | 26 |
| 55 | 28 |
| 60 | 29 |
| 65 | 30 |
| 70 | 31 |
| 75 | 31 |
| 80 | 34 |
| 85 | 34 |
| 90 | 35 |
| 100 | 32 |
| 110 | 32 |

*Fig. 28*

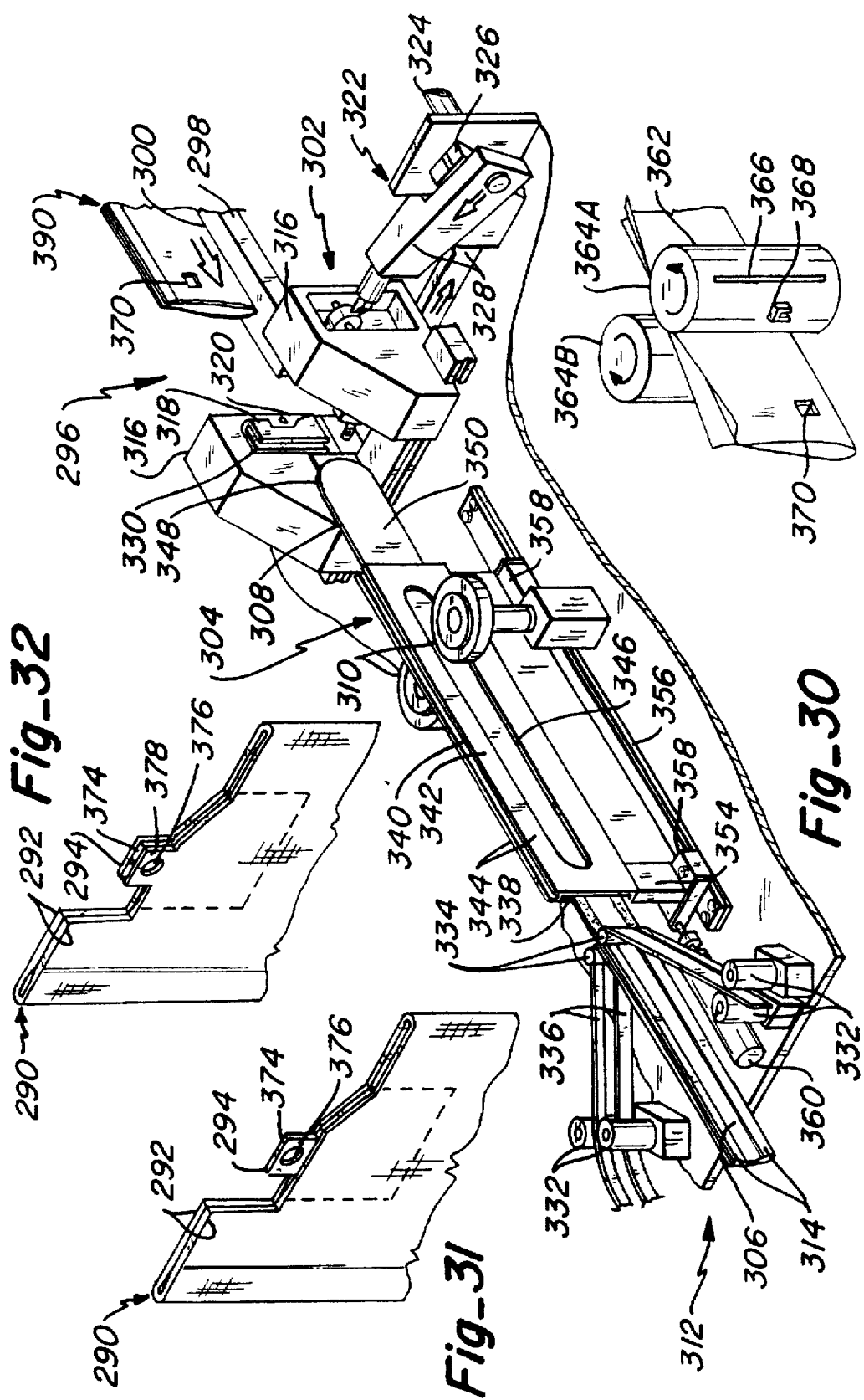

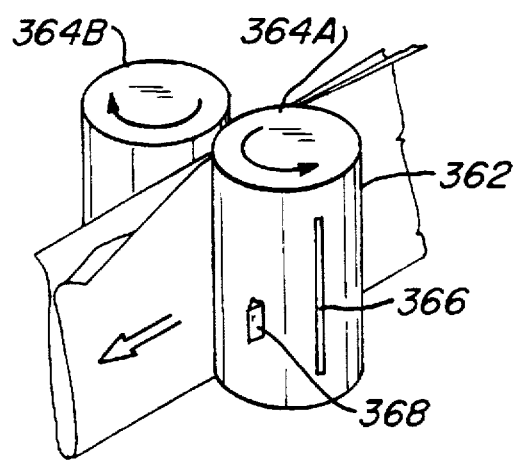
Fig_30B
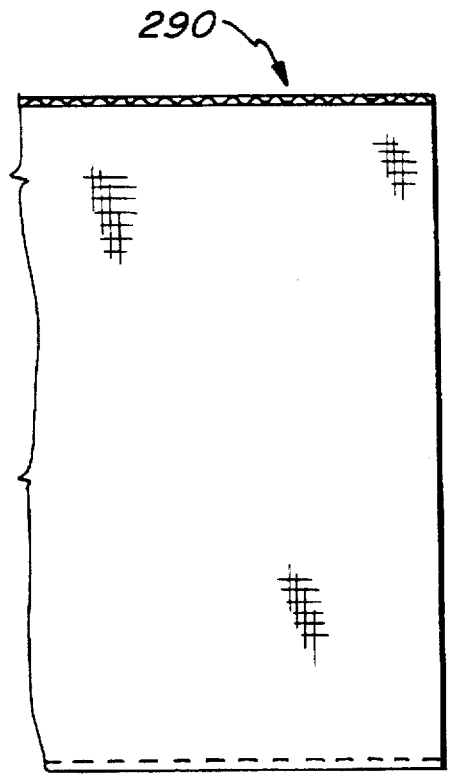
Fig_43A
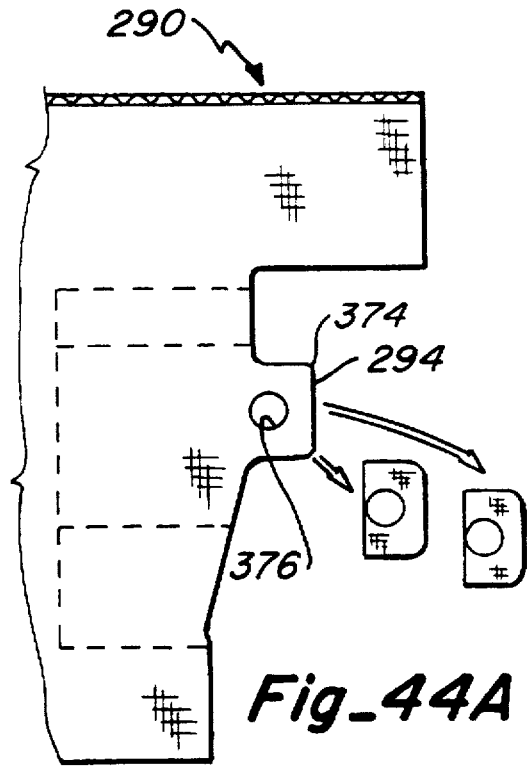
Fig_44A

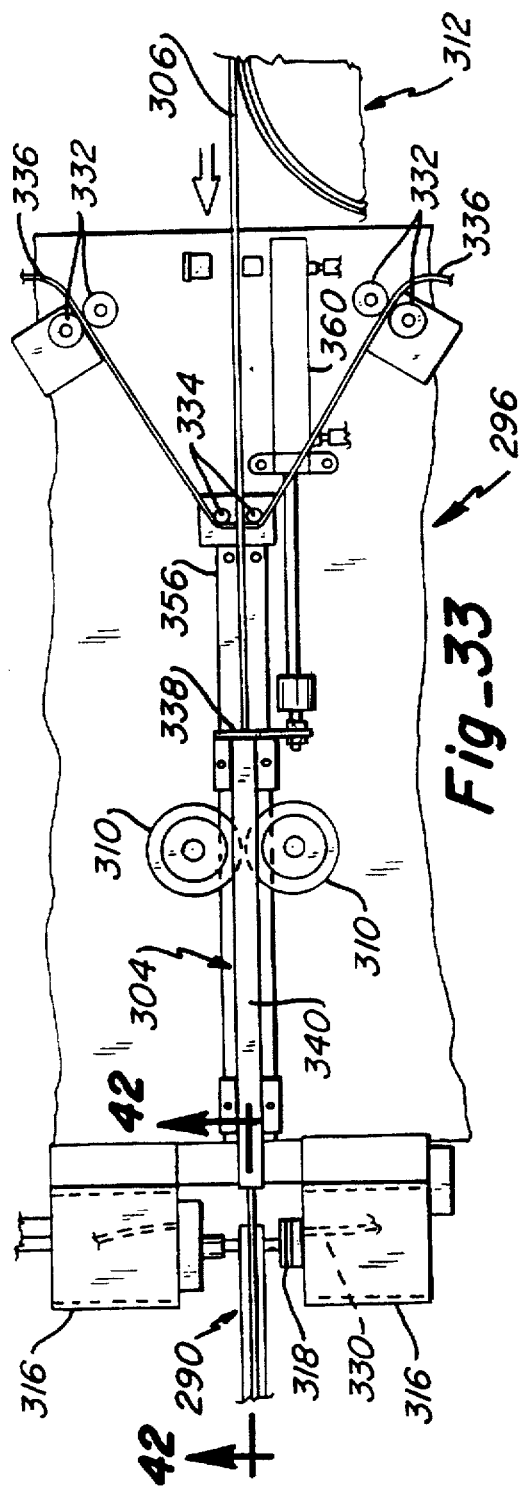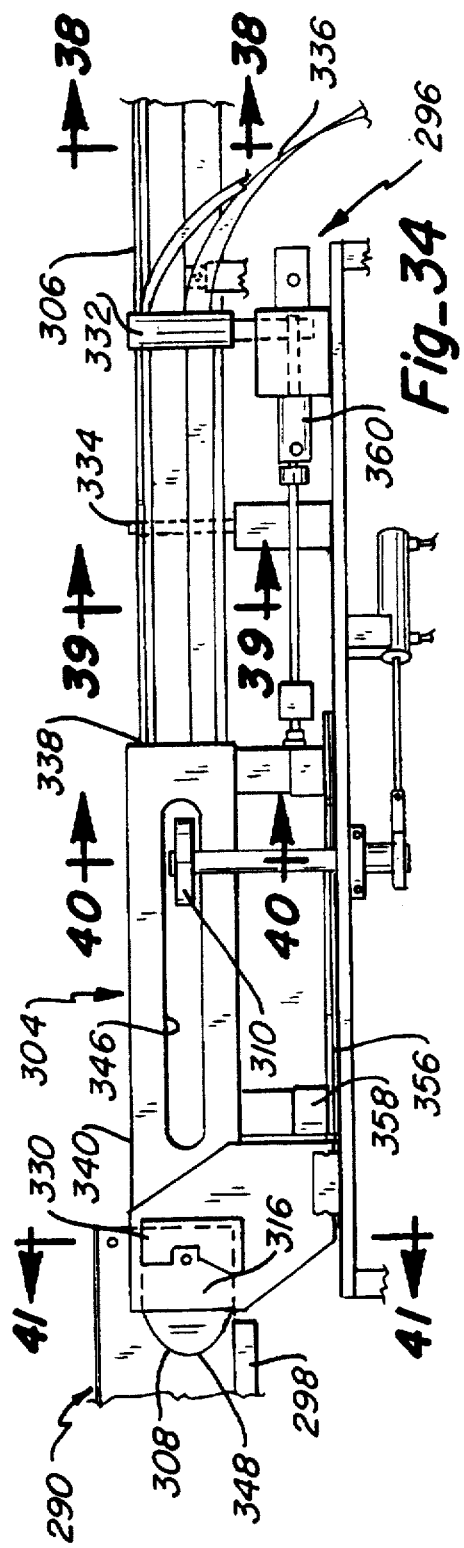

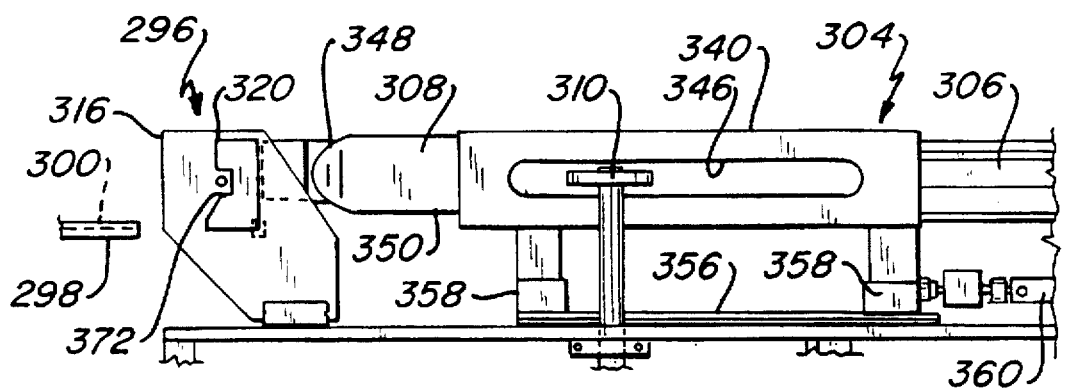
Fig_35
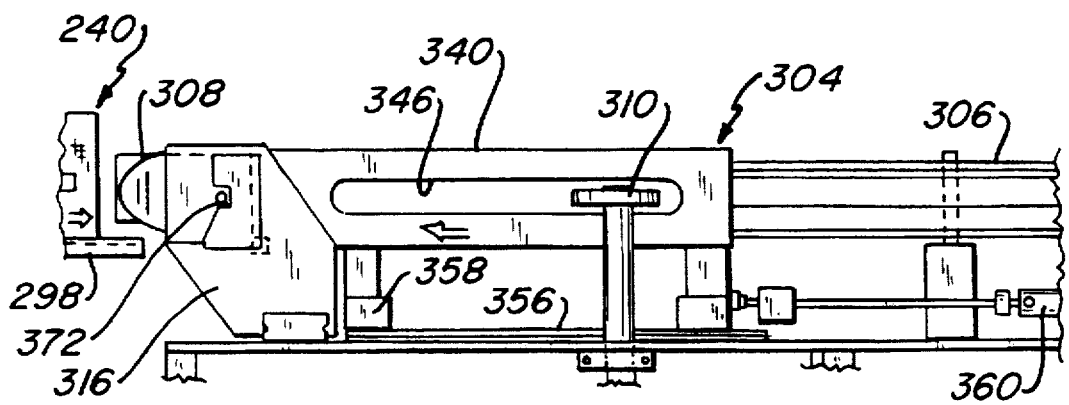
Fig_36
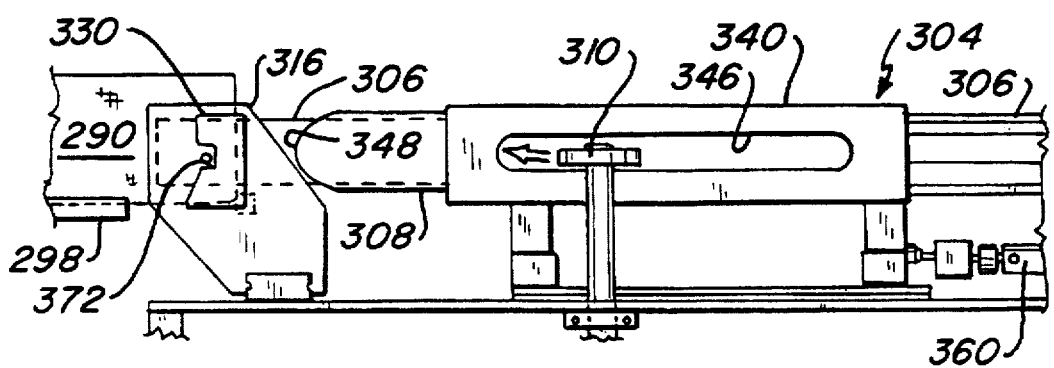
Fig_37

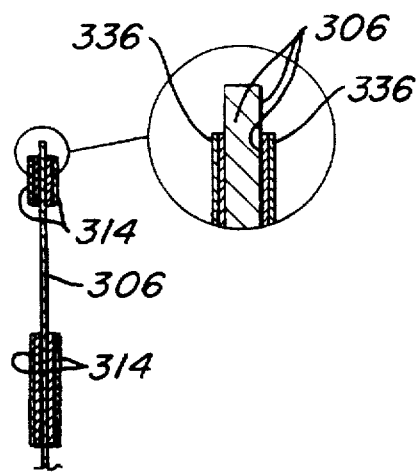
Fig_38
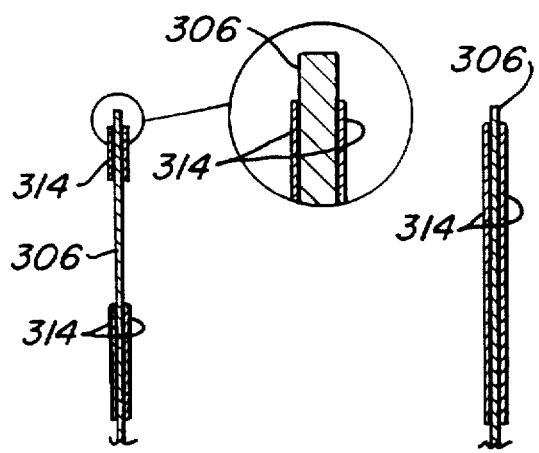
Fig_39   Fig_39A
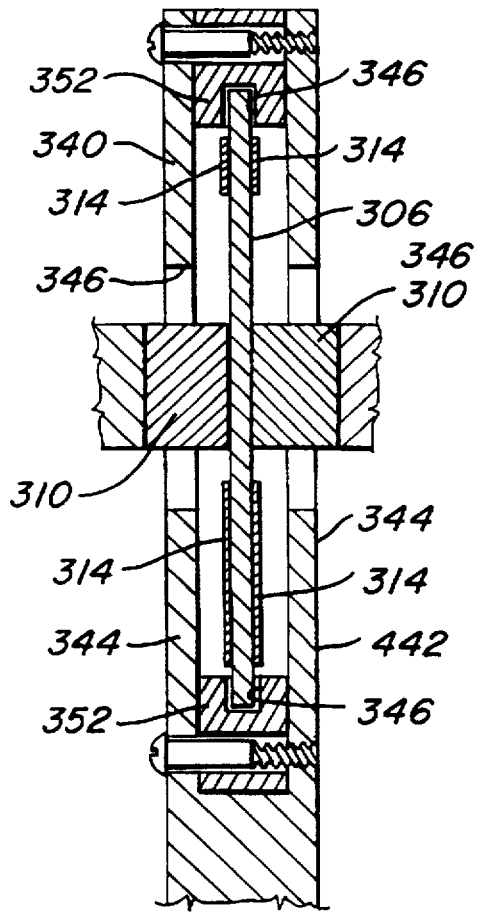
Fig_40
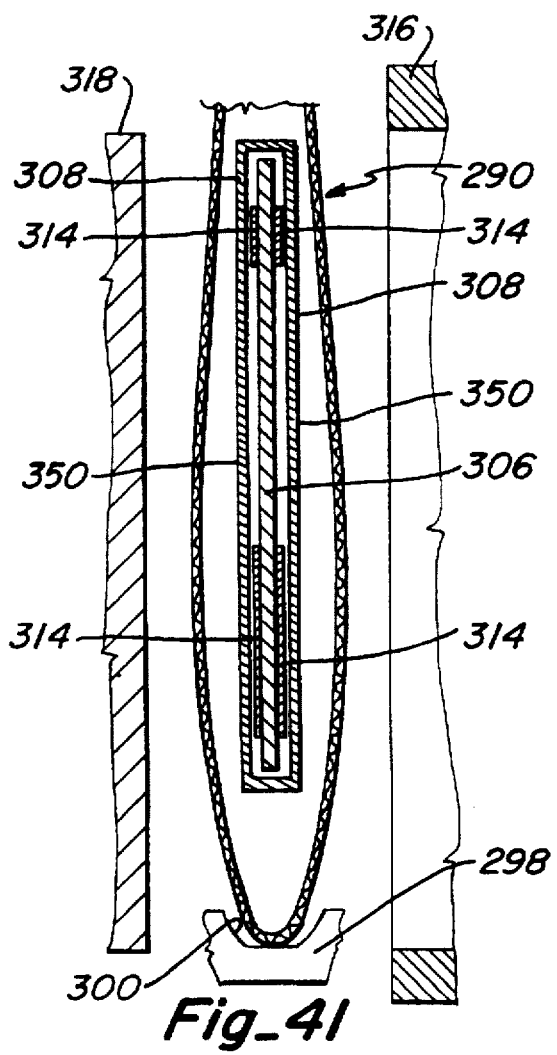
Fig_41

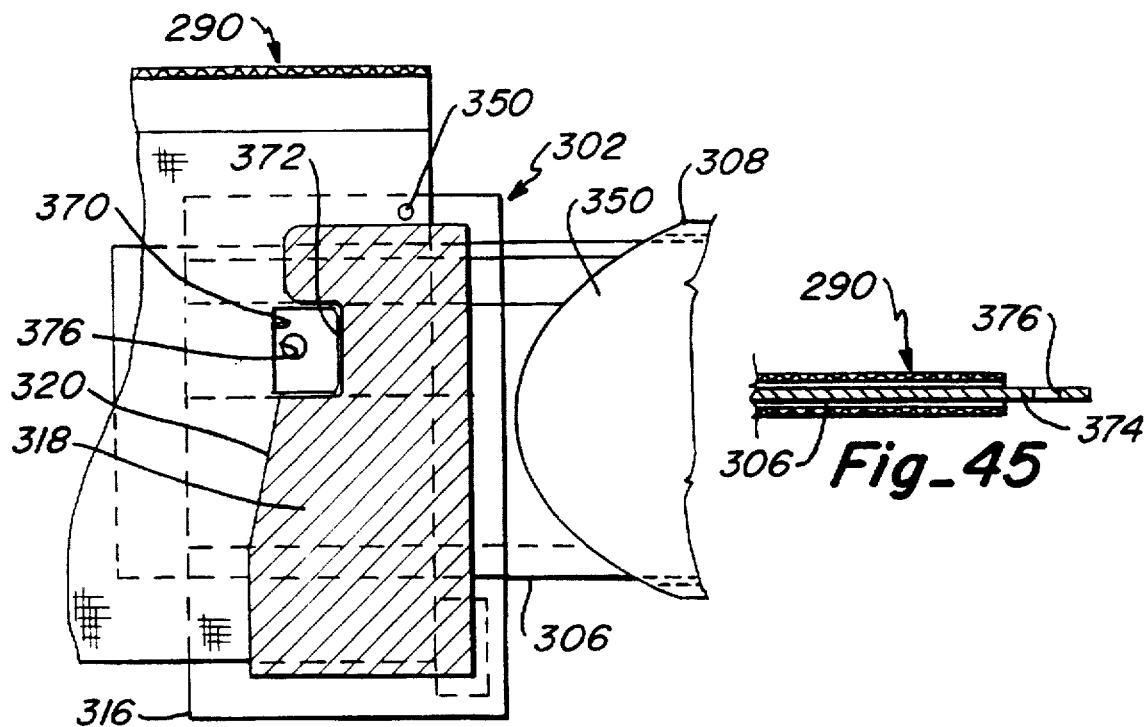
Fig_42
Fig_45
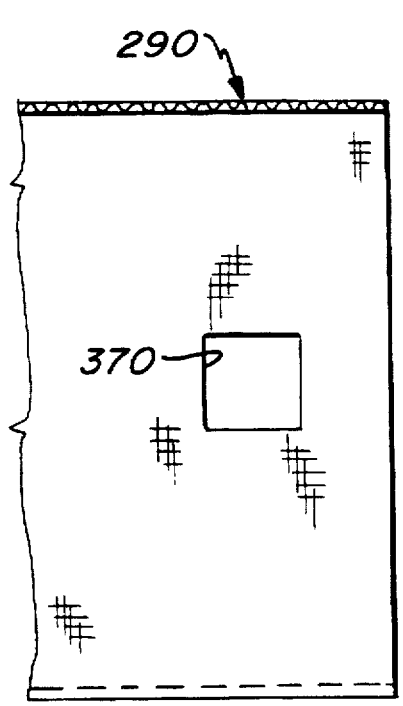
Fig_43
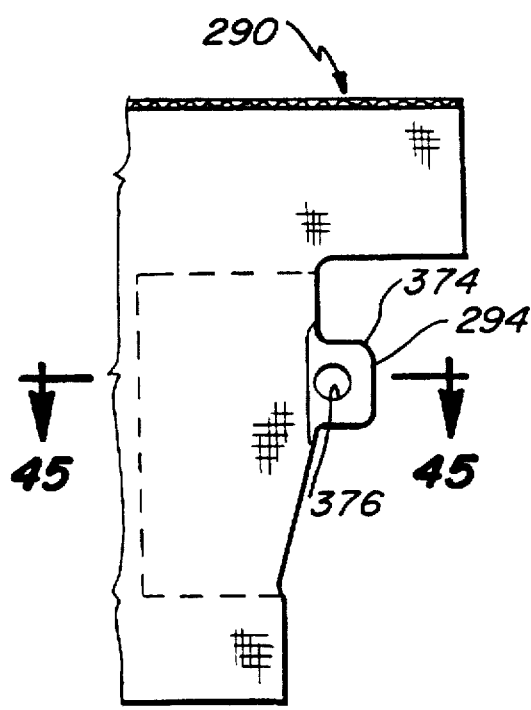
Fig_44

VANE FOR AN ARCHITECTURAL COVERING AND METHOD OF MAKING SAME

CROSS-REFERENCE TO RELATED APPLICATIONS

This application is a continuation in part of U.S. application Ser. No. 08/437,959 filed May 10, 1995 for A Vane For An Architectural Covering.

BACKGROUND OF THE INVENTION

1. Field of the Invention

This invention relates generally to coverings for architectural openings and more particularly to an improved vane that may be used in a vertical window blind, door blind, or to otherwise furnish the interior of a dwelling.

2. Description of the Known Art

Vertical blinds have been known in the art for some time. A typical vertical blind has a headrail that contains a carrier mechanism, a tilt rod, and a plurality of operatively interconnected vertical vanes. The carrier mechanism includes a plurality of hangers for individually suspending the vertical vanes. The carrier mechanism is coupled to the tilt rod so that when the tilt rod is rotated the hangers are caused to rotate about vertical axes which in turn rotate the vertical vanes to which they are attached about the same axes. The vanes are always hung from their top edge with the hangers being undesirably visible or requiring a valence to cover them up.

Vanes for vertical window blinds are typically made with one or more of four different types of materials. These materials are fabric, polyvinylchloride (PVC), aluminum and wood. The most common vanes are made from either fabric, PVC or a combination of fabric and PVC. Fabric vanes offer a very appealing softer appearance. The fabric adds quality to a vane and gives it a finished look. It also provides a designer with a number of design choices regarding the type of fabric to use for a particular room. PVC vanes are plastic and therefor have a harder plastic appearance. One advantage of the PVC vane, however, is its strength. PVC vanes can be laminated or wrapped with fabric to provide the PVC strength with the fabric appearance.

There are disadvantages, however, to vanes made of fabric, PVC or combinations thereof. Vanes made solely of fabric are thin, and tend to twist along their length when rotated from the top edge. They further are substantially two dimensional. PVC vanes also tend to twist along their length when rotated from the top edge. The PVC vanes are also normally thin, even though they can be molded to provide a three dimensional shape. This shape is usually curved in cross-section, e.g. a C-shape or an S-shape, and the thickness of the vane is usually about ⅛ inch or less. Additional thickness is too costly for the window blind market.

Several hybrids exist for fabric vertical vanes. Fabric vanes are often treated with a stiffener to impart structural rigidity. The stiffener takes away the fabric's hand or softness, but retains the look of the fabric. The vane will still twist, but less than non-treated fabric vanes. The treated fabric vanes also tend to curl in direct sunlight if the stiffener is not applied uniformly. Another hybrid, as mentioned previously, is a PVC vane laminated with a fabric. Such a vane has the structural strength and three-dimensionality offered by a PVC vane with the appearance of a fabric vane. The fabric in this case also looses its hand or softness. Problems common with PVC/fabric laminate vanes are that in sunlight, the fabric may curl and delaminate, there is increased assembly costs, the vanes are relatively heavy and when the fabric is only laminated onto one face of the PVC, the reverse side is aesthetically displeasing. Another design includes a PVC vane core that is wrapped loosely with fabric. This provides a softer product with a fabric look, but it is very costly and difficult to fabricate. One other approach is a PVC vane with a groove along each edge so that a fabric insert can be positioned in and along the faces of the PVC vane. This approach is also costly, does not prevent longitudinal twisting and the reverse face and the grooved edges detract from the fabric appearance.

All of the prior art vertical vanes cast a distinct, well defined shadow on the adjacent vane when the vanes are completely closed and slightly overlapped in a window and are in direct sunlight. This shadow creates the effect of stripes on the surface of the closed vertical blind resulting in objectionable aesthetics.

Vanes, more commonly referred to as slats, found in venetian blinds, as opposed to vertical blinds, typically have different qualities as they are disposed horizontally rather than vertically. In fact, some slats found in venetian blinds are of hollow construction. By way of example, U.S. Pat. No. 2,169,873 to W. D. Clark, Jr.; U.S. Pat. No. 2,326,454 to Scipio S. Gentile; and U.K. Patent No. 623,832 assigned to Chr. Fabers Fabriker disclose hollow slats for use in a venetian blind. Since slats in venetian blinds are disposed horizontally, they must be self-supporting along their length. A self-supporting slat by its very nature must be somewhat rigid and therefore will not have a soft hand or feel. The venetian blind slat is rotated about a horizontal longitudinal axis by conventional tape ladders on which it is supported. This method of support does not require energy transfer from one end of the slat to the other as with vertical blinds. A vane in a vertical blind is supported from its top edge and is preferably rotated from its top edge. Therefore, it is not necessary that it be self supporting along its length. To rotate a vertical blind vane, energy must be transmitted from the top of the vane to the bottom in order for the entire vane to rotate. Uniform rotation along the entire length of the vane has been a problem with prior art vertical vanes.

Therefore, it is an object of the present invention to provide a vane for a vertical blind that is three-dimensional, has a soft hand or feel, does not twist from top to bottom when rotated from the top but rather rotates uniformly, hides the hanger of the carrier mechanism, diffuses the light passing through the shade so that no distinct, sharply defined shadows are formed, and has a durable attachment incorporated therein for reinforcement when the vane is suspended from an operating system.

SUMMARY OF THE INVENTION

The vertical vane of the present invention is preferably tubular in configuration thereby providing three-dimensionality and torsional rigidity along its length. It is preferably formed from fabric having diagonal dimensional stability. Diagonal dimensional stability means that the vane fabric is not stretchy when pulled diagonally relative to the machine direction of the fabric. The machine direction of the fabric is defined as the dimension of the fabric extending in the direction the fabric is moved through the machine in which it is manufactured. The longitudinal dimension of the vane preferably extends in the machine direction of the fabric. The diagonal, dimensionally stable fabric allows the vane to carry torque along the length of the tubular vane construction, thus inhibiting longitudinal twisting. Fabrics which are not totally stable but at least have diagonal dimensional memory may also be used such that if slightly stretched along a diagonal will, over a short period of time, return to the original orientation.

The tubular vane may be made from tubularly manufactured fabrics, a single sheet of fabric that is folded over onto itself to define a hollow vane or it may be made of multiple sheets of fabric joined together to define a hollow vane. The fabric may also be creased along a fold line to provide structural and/or aesthetic variety. A resilient layer may be laminated to the inner side of the sheet, i.e., the side that will be inside the vane. The resilient layer helps to spring the vane fabric back from a flattened state that may occur during shipping. It also helps to retain the vane's three-dimensionality.

In multiple sheet configurations, two sheets or more may be joined together with adhesive or by some other bonding method to create a tubular structure. In this type of configuration, many different shapes can be attained and resulting bond lines replace the crease or creases that may be found in a vane constructed with a single sheet of fabric. A prime feature in preventing twist in these arrangements and giving the vane torsional rigidity is diagonal dimensional stability or memory of the fabric. An advantage to this construction is that different materials may be used to construct the tubular vane for aesthetics and other purposes.

Another aspect of the invention is its ability to hide the hardware that is utilized to hang the vanes from the headrail of an operating system. This makes for a far more pleasing aesthetic look. To achieve this, a hanger plate is inserted into the open top end of each vane and attached to the top of the vane. The hanger plate is preferably positioned so that the hanger that extends from a carrier mechanism mounted in the headrail is substantially hidden within the hollow interior of the tubular vane. Ideally, the hanger plate is positioned so that the top of the vane either abuts the bottom of the headrail or almost abuts the bottom of the headrail when the vane is hung on the hanger.

The vane may have a single hollow portion or cell, or may have multiple hollow portions or cells. These portions or cells being defined by the way the product is folded and constructed. The typical and most cost effective vane will have a single hollow section, even though multiple cell constructions also have benefits.

Another advantage of the invention is that the hollow vane diffuses light in a unique fashion. The shadow created by the overlap of two vanes is diffused by the tubular shape of the vane so the shadow is not apparent. This results in a product having a much more subdued and pleasing look over the harsh shadows of prior art vertical vanes. The thicker the tubular vane, the more apparent this effect becomes.

The vane can also be formed with reinforcement in the top end if the vane is to be used in a vertical vane covering. The reinforcement is in the form of a plastic insert positioned in the hollow top end of the vane and the sides of the vane are secured to the plastic insert thereby closing the end of the vane while providing for positive and durable connections to an operating system.

Other objects, features and advantages of the present invention will become more fully apparent from the following detailed description of the preferred embodiment, the appended claims and the accompanying drawings.

BRIEF DESCRIPTION OF THE DRAWINGS

FIG. 7 is a section taken through a first alternative embodiment of the vane.

FIG. 8 is an end view of a pre-creased web of material used to manufacture the tubular vane of FIG. 7.

FIG. 9 is a transverse section of a folded web during construction of the vane of FIG. 7 better illustrating the crease shown in FIG. 8.

FIG. 10 is an enlarged fragmentary section illustrating the relative size of the crease.

FIG. 26 is a table comparing the torque index of vanes manufactured in accordance with the present invention with single ply and double ply planar vanes.

FIG. 28 is a table comparing tubular vanes made of fabrics with and without diagonal, dimensional stability.

FIG. 30 is a fragmentary isometric of a portion of the apparatus illustrated schematically in FIG. 6 illustrating an apparatus and method for inserting reinforcement in the open upper end of a vane.

FIG. 30A is a fragmentary isometric of an alternative cutting mechanism to that shown in FIG. 6.

FIG. 30B is a fragmentary isometric of another alternative cutting mechanism to that shown in FIG. 6.

FIG. 31 is a fragmentary isometric of the upper end of a vertical vane incorporating reinforcement at the top end for suspending the vane.

FIG. 32 is a fragmentary isometric similar to FIG. 31 showing an alternative system for reinforcing the top end of a vane.

FIG. 33 is a fragmentary top plan view of the apparatus shown in FIG. 30.

FIG. 34 is a fragmentary left side elevation of the apparatus shown in FIG. 30.

FIG. 35 is a fragmentary operational side elevation of the apparatus shown in FIG. 30.

FIG. 36 is a fragmentary side elevation similar to FIG. 35 with the components in a different operative position.

FIG. 37 is a fragmentary side elevation similar to FIG. 35 with the components in still another operative position.

FIG. 38 is an enlarged section taken along line 38—38 of FIG. 34.

FIG. 39 is an enlarged section taken along line 39—39 of FIG. 34.

FIG. 39A is a section similar to FIG. 39 showing an alternative form of adhesive to that shown in FIG. 39.

FIG. 40 is an enlarged fragmentary section taken along line 40—40 of FIG. 34.

FIG. 41 is an enlarged fragmentary section taken along line 41—41 of FIG. 34.

FIG. 42 is an enlarged fragmentary section taken along line 42—42 of FIG. 33.

FIG. 43 is an enlarged side elevation of the top end of a vane prior to being die cut.

FIG. 43A is an enlarged fragmentary side elevation of the top end of a vane prior to being die cut in accordance with the alternative cutting mechanism shown in FIG. 30B.

FIG. 44 is a fragmentary side elevation similar to FIG. 43 showing the same portion of the vane after having been die cut.

FIG. 44A is a fragmentary side elevation similar to FIG. 44 showing the end portion of a vane after having been die cut with the cutter shown in FIG. 30B.

FIG. 45 is a section taken along line 45—45 of FIG. 44.

DETAILED DESCRIPTION OF THE PREFERRED EMBODIMENTS

Figure 1:
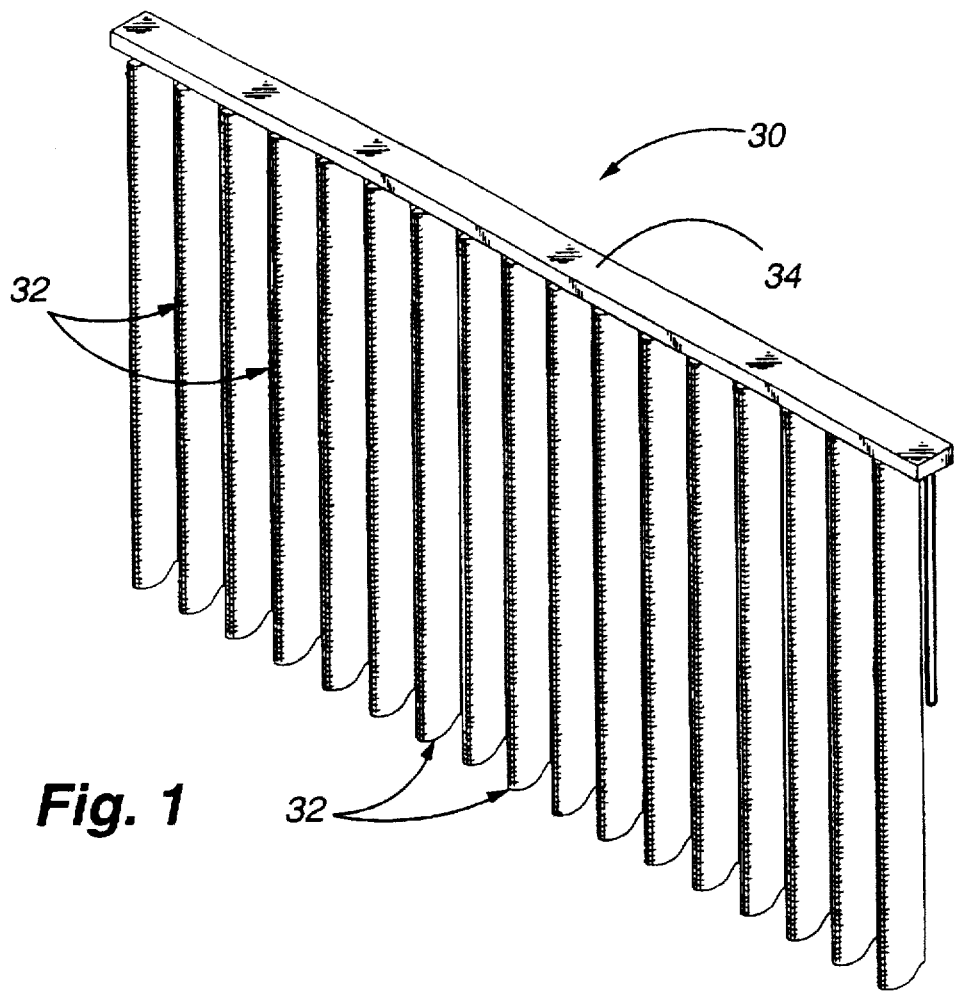
FIG. 1 is a frontal isometric view of a vertical window blind incorporating the tubular vane of the present invention.

Referring first to FIG. 1, a covering 30 in the form of an architectural covering device incorporating the vanes 32 of the present invention is illustrated. For purposes of the present disclosure, the covering 30 will normally be referred to as a vertical window blind, it being recognized that the covering could be used for other architectural purposes such as on doors or to otherwise furnish the interior of dwellings. The window blind broadly includes a headrail 34 suspendable from a wall or ceiling adjacent to a window opening and an operating system (not fully shown) connected to the headrail and adapted to suspend a plurality of the vertically extending vanes 32.

The operating system, which is not fully shown as it does not form part of the present invention, would preferably include a plurality of carriers associated with each vane 32 with the carriers being operatively engaged with a horizontally disposed tilt rod in the headrail such that rotation of the tilt rod causes the carriers to pivot about a vertical axis. Such operating systems for vertical vane window coverings are well known in the art. A hanger plate 36 (FIG. 2) affixed internally to the upper end of a tubular vane is adapted to be releasably connected to an associate carrier. The hanger plate can be affixed to either side of the vane. The hanger plate is preferably bonded to the vane with a pressure sensitive adhesive but may be affixed in any other suitable manner, such as ultrasonically, so as to move in unison with the associated vane.

Figure 5:
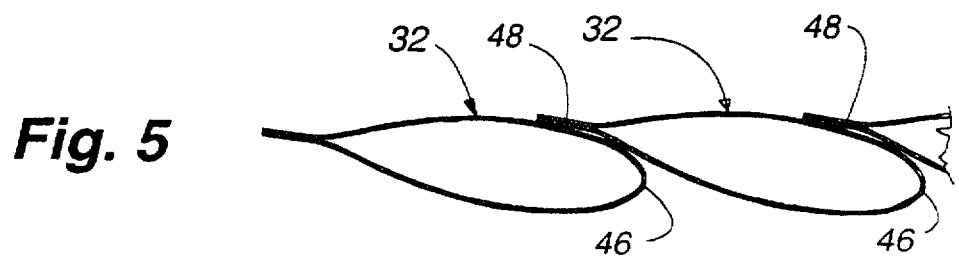
FIG. 5 Fragmentary horizontal section taken through several overlapped vanes of the type shown in FIG. 2 in the extended closed position of a window blind.

The window blind 30 is operative for movement between extended and retracted positions, as well as open and closed positions. In the extended position shown in FIG. 1, the vanes are uniformly distributed across the window opening, while in the retracted position (not shown), the vanes are horizontally stacked together adjacent either or both sides of the window opening. The vanes are pivotal to move the blind between the open and closed positions. In the open position shown in FIG. 1, the vanes extend perpendicularly to the headrail, while in the closed position of FIGS. 3 and 5, they preferably partially overlap in shingle-like touching relation and extend in substantially parallel relation to the headrail.

Figure 2:
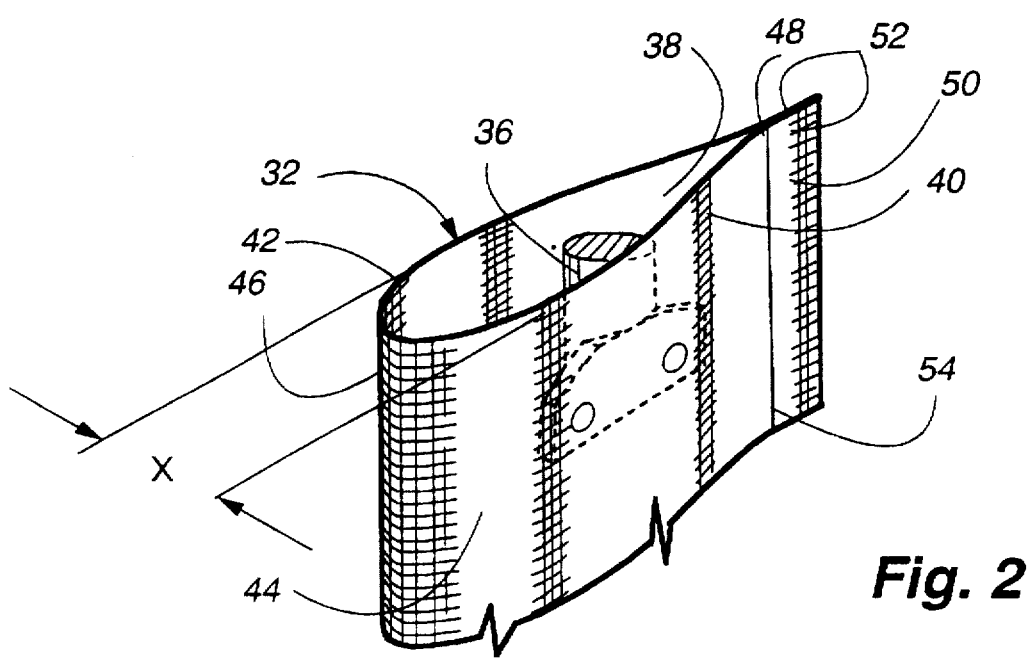
FIG. 2 is a fragmentary isometric of the upper end of the tubular vane shown in FIG. 1 showing a hanger plate attached to the vane.

Referencing FIG. 2, a vane 32 fabricated in accordance with the present invention can be seen to be made of a single strip or web of sheet material, preferably fabric, formed into an elongated tube so as to give the vane torsional rigidity along its length. The vane therefore has an inner surface 38 and an outer surface 40. The material may be a single layer or a laminate. If it is a laminate, the inner surface of the laminate would normally be functional and possibly not as aesthetically pleasing while the outer surface of the laminate would normally be less functional and more aesthetically pleasing. The tubular construction of the vane is both structurally sound and aesthetically pleasing.

The vane 32 has two equal length outwardly convex outer walls 42 and 44 defining a smooth rounded curve along one folded side or front vane section 46 of the vane and a relatively thin substantially flat tail 48 at the other side or rear vane section 50 of the vane where the free edges 52 of the strip of material from which the vane is made are disposed proximate each other. The free edges 52 of the strip are joined together, as with adhesive, along a bond line 54 extending the length of the vane. The folded one side 46 of the vane is rounded so as to simulate a rounded pleat found in conventional draperies. The spacing between the walls 42 and 44 of the vane at the location where they are maximally spaced, as designated by the letter "X" in FIG. 2, is preferably in the range of ⅛" to 1" for a vane that is three and one-half inches wide from the rounded side 46 to the tail side 50. This particular structure of the vane makes it possible to use a number of materials, many of which do not have inherent structural rigidity, but which are inherently somewhat biased toward a flat orientation to create a hollow tubular vane suitable for use in a vertical vane window covering. The availability of various materials creates a wide variety of choices of textures, colors and fabrics.

The aesthetic attributes of the design of the vane 32 stem from it three-dimensionality, the hollowness of the vane, the tail 48, and the fact that different materials may be used in the construction. The three-dimensionality of the vane provides a softer, less harsh appearance in the window than conventional fabric vertical vanes. The soft appearance is present in both the open and the closed positions of the vanes. Further, in the retracted position the blind provides a curtain like look.

Figure 3:
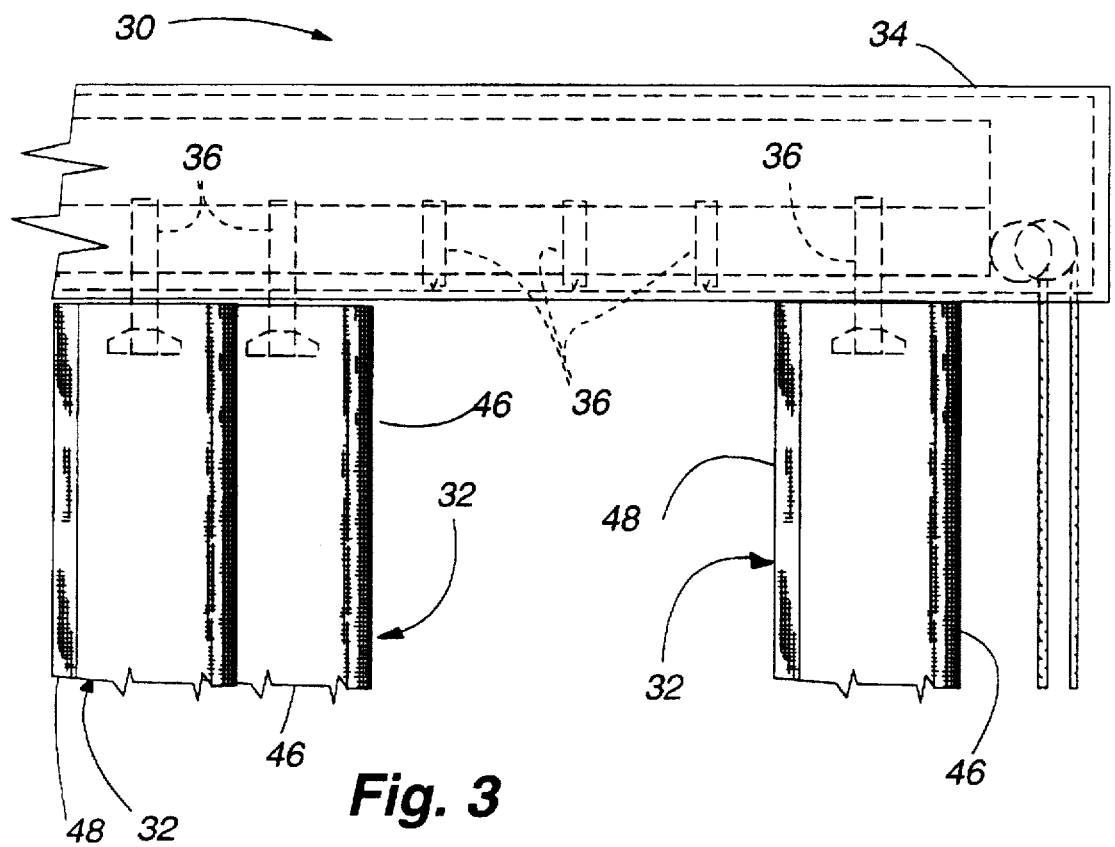
FIG. 3 is a fragmentary front elevation of a window blind incorporating the tubular vane of the present invention in the extended closed position illustrating how the hanger plates are hidden in the vanes.
Figure 4:
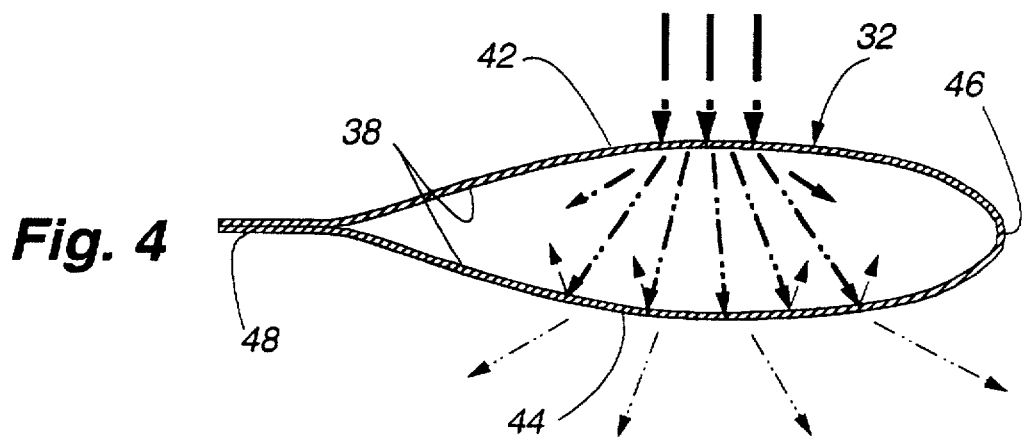
FIG. 4 is a diagrammatic horizontal section taken through the tubular vane of FIG. 2 illustrating the diffusion of light passing through the vane.

The hollow vanes 32 provide two significant functional advantages over prior art vertical vanes. The first is that the hanger plate 36 can be totally hidden within the vane as best seen in FIGS. 2 and 3. In prior art vertical blinds the hardware is visible and is not very attractive. The second advantage of the hollow vane is that it diffuses light in a fashion that breaks up the harsh shadows created with prior art vertical vanes. This diffusion is a result of two effects as illustrated in FIG. 4. The first effect results in diffusion when direct sunlight is diffused by the first wall 42 of the vane so a distinct shadow is not cast on the second wall 44 of the vane. The light diffusion is inherent to a fabric and is enhanced by the second wall of the tubular vane. The second effect is the internal reflection of sunlight within the hollow interior of the tubular vane. If the inner surface 38 is white, it reflects light. The reflected light is spread over the entire surface of the vane and thus, instead of a distinct shadow at the point of overlap of two adjacent vanes, a diffuse or subtle shadow occurs.

The relatively flat and thin tail 48 of the vane 32 is adapted to overlap (FIG. 5) an adjacent vane when the window covering is in the extended closed position and, therefore, improves vane closure of the blind. Enhanced vane closure improves the overall performance of the blind for providing privacy and light control. It also results in a more attractive product because no unwanted light can shine through gaps in the blind. It will be appreciated that whether or not the blind is in the open or closed position, a rounded surface of the vane faces the interior of the building structure in which the blind is mounted thereby presenting a soft appearance similar to conventional drapery.

The vane 32 is made of a flexible material and functions best if the material has diagonal, dimensional stability. Diagonal, dimensional stability is a characteristic of a fabric that substantially prevents the fabric from stretching or shrinking along a line diagonal to either the machine direction of the fabric or the cross-direction of the fabric. For purposes of the present disclosure, a fabric that is diagonally dimensionally stable is defined as a fabric that can be stretched no more than 10% along a forty-five degree diagonal to the machine direction of the fabric when a force of eight ounces is applied between two points along this diagonal. As mentioned previously, it is preferable that the longitudinal dimension of the vane extends in the machine direction of the fabric. The diagonal, dimensional stability is a factor in the vanes' ability to resist twisting from top to bottom when rotated from the top. The diagonally, dimensionally stable characteristic of the material facilitates the transfer of torque along the length of the tubular vane. The diagonal, dimensional stability of the fabric, in conjunction with the hollow structure of the vane, essentially prevents longitudinal twisting even though the vane will readily bend under gravity if disposed horizontally.

Examples of materials having diagonal, dimensional stability are almost all nonwoven fabrics, and some knit fabrics. Wovens are generally quite stretchy when pulled diagonally, though it is not beyond comprehension that a diagonally, dimensionally stable woven could be created such as by laminating the woven to a stabilizing nonwoven of some kind, a film, or by using large amounts of stiffener.

It is preferred, though not essential, that the material give a nice quality of transmitted light. The preferred material is white so as to provide a transmitted light that is of a nice white color and quality. Major variations do exist in the quality of vane materials and it is difficult to judge the quality of the light other than to test variations with a consumer panel.

The strength requirement for material is that it be strong enough to not be torn easily and that it does not pill when abraded. The requirement that the material does not tear is especially relevant at the location in the vane where the hanger plate 36 is attached.

The material desirably also has a very nice hand. The hand of a fabric is its tactile qualities that include softness, firmness, elasticity, fineness, drape and other qualities perceived by touch. A fabric with a nice hand can be used for the vane as long as it has or can be provided with diagonal, dimensional stability since the fabric does not have to be treated with a stiffener to transfer torque when in a tubular configuration.

A material that has performed satisfactorily for constructing the vane is a 90 gram/m$^2$ acrylic bonded polyester spunbond nonwoven fabric manufactured by Unitika Corporation headquartered in Japan. Another suitable material is an opaque knit fabric identified by style number 34184 and manufactured by Guilford Mills of North Carolina. Both of these fabrics give a good balance of the characteristics described above. In addition, knitted or woven fabrics could be laminated to a nonwoven or knit fabric of the type mentioned.

While it is preferred that the fabric be diagonally, dimensionally stable, fabrics which have diagonal, dimensional memory may also be used. A fabric with such memory might be slightly more stretchable along its diagonal than a fabric that is diagonally, dimensionally stable but will return to its original orientation over a relatively short period of time. For purposes of the present disclosure, a tubular vane made in accordance with the present invention and from a fabric that has diagonal, dimensional memory will return to its original orientation in less than two minutes when twisted along its longitudinal axis 45 degrees from top to bottom and the vane is 84 inches in length and 3.5 inches in width. In other words the fabric would have some degree of resiliency along its diagonals.

As mentioned previously, the vane 32 is made from an elongated web or strip of material. The strip is rectangular in configuration so as to have the aforenoted two longitudinally extending side edges. The strip is formed into a tube generally simulating an airfoil. This tubular construction provides the vane 32 with torsional rigidity along its length which is enhanced by the use of a diagonally, dimensionally stable fabric. The torsional rigidity resists the twisting that prior art vertical vanes have exhibited.

The preferred method of producing the vane 32 requires several steps schematically illustrated in FIGS. 6, 6A, 6B, 6C and 6D. The first step is heat stabilization of the material used to manufacture the vane if the material is a fabric. Non-fabrics, such as paper or the like, and even some fabrics, would not have to be heat stabilized particularly when they are not subject to shrinkage. Heat stabilization, when used, is used to prevent differential shrinkage of the vane which will cause the vane to bow. The heat stabilization would be performed while a web or strip of the fabric 55 is run through a fabric straightener 57. A seven-inch wide web has been found suitable but other widths of material could be used. The fabric straightener may consist of a heat roller 59 and a cooling roller 61. The fabric straightener takes any inherent bow, or curve, out of the raw fabric before it is further processed. The fabric straightener 57 is desirable because the tubular vane construction can amplify any curve present in the raw fabric into a significant bow in the finished vane. For example, if a roll of 7-inch wide vane material is rolled and laid flat on the floor over a length of 50 feet, the material may bow as much as ¼ inch over the 50-foot length. When this bowed material is produced into a vane, the vane might also have ¼ inch or more of bow in a six foot length. This amount of bow is typically unacceptable in the window covering industry where aesthetics are of prime importance. In fact, any bow greater than about ¼ inch in a vane that is 84 inches long or less is generally unacceptable.

The straightened fabric 55 is then folded by a folder or former 63 as illustrated in FIGS. 6, 6A, 6B, 6C and 6D by simultaneously raising the side edges 65 of the web until they are disposed proximate each other as the web is advanced through the folder or former. The sides should be raised simultaneously rather than folding one side onto the other side, because the stresses caused by folding will be uniform on both sides of the web. The folding is accomplished by running the web through the folder or former that has an internal contoured wall that captures the web and gently causes both sides of the web to move toward one another. The sides edges 65 eventually lie proximate to each other. The folding apparatus preferably has a central member or beam 67 that holds the creased web down as it is folding the sides of the web.

Figure 6:
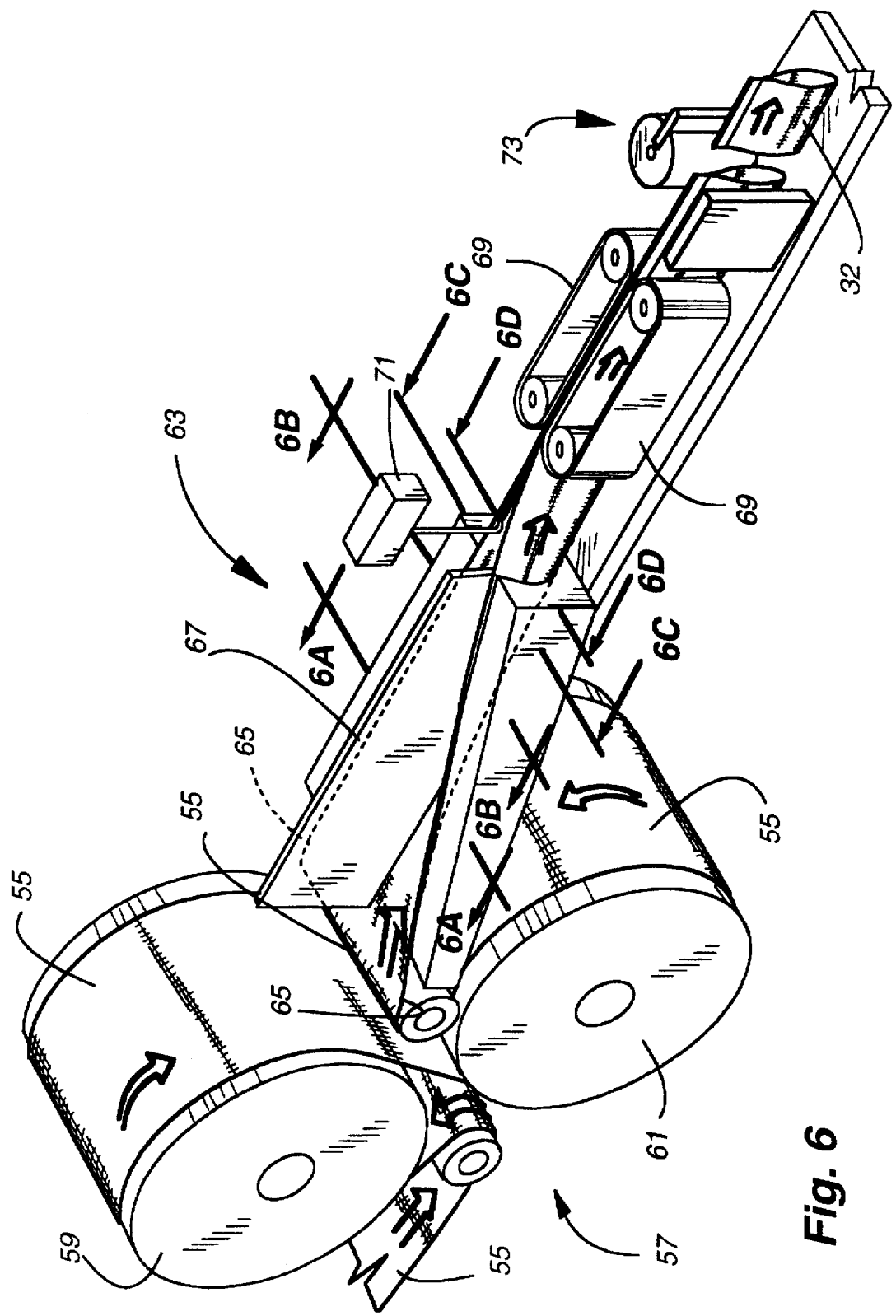
FIG. 6 is a schematic isometric illustrating a method of forming the vane shown in FIGS. 1 through 5.
Figure 6A:
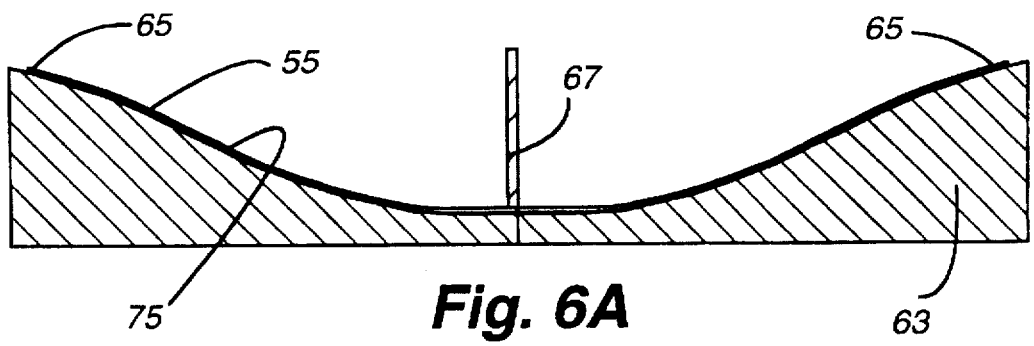
FIG. 6A is a section taken along line 6A—6A of FIG. 6.
Figure 6B:
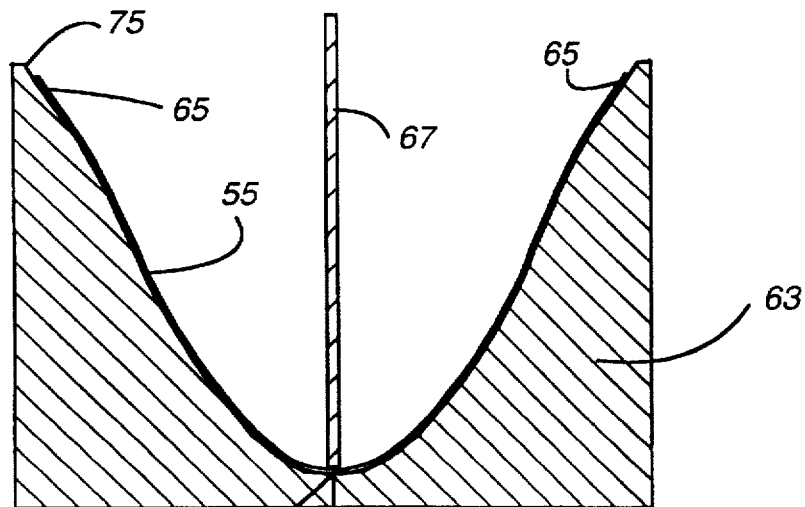
FIG. 6B is a section taken along line 6B—6B of FIG. 6.

FIGS. 6A–6D illustrate in cross-section the configuration of the internal wall 75 of the folder or former 63 and its affect on the web of fabric 55 as the fabric is moved through the folder. It should be appreciated that the fabric inherently wants to remain flat or in other words is somewhat biased toward a flat orientation so that it will naturally follow the contours of the internal wall of the former. As can be seen in FIG. 6A, the folder at a location upstream from its longitudinal center defines a relatively wide trough wherein the side edges 65 of the web are lifted slightly. In FIG. 6B, which is a cross-section downstream from FIG. 6A, the trough is slightly narrower and the side edges 65 have been raised considerably. The lowermost portion of the web, at the longitudinal center of the web, has been folded into the rounded side 46.

Figure 6C:
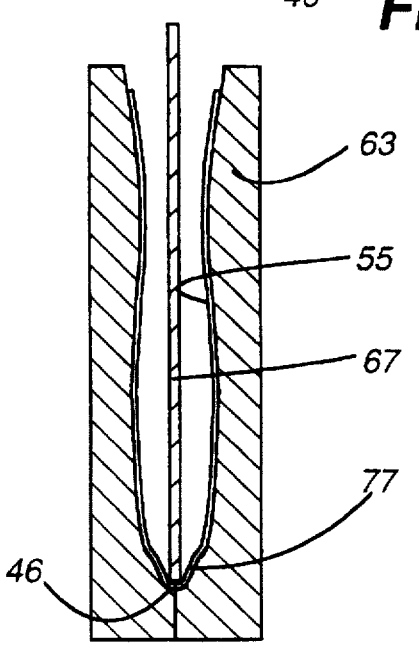
FIG. 6C is a section taken along line 6C—6C of FIG. 6.
Figure 6D:
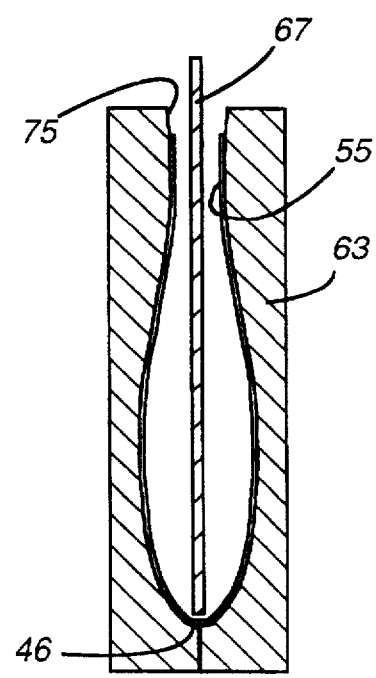
FIG. 6D is a section taken along line 6D—6D of FIG. 6.

FIG. 6C is a cross-section near the downstream end of the folder and it will be seen that the trough is shaped generally like a narrow U and is even narrower than it is at the extreme downstream end shown in FIG. 6D. Further, the lower end of the trough has a relatively narrow V-shaped section 77 that forms a very slight crease in the rounded and folded side 46. The crease is not enough to form a permanent bend in the fibers of the fabric but only enough to deform the fabric so that the fold is slightly narrower than it would be without the slight crease and is springy or resilient so as to retain the bias that urges the side walls 42 and 44 away from each other. The bias on the side walls forces the tubular fabric web to expand and follow the contour of the inner wall 75 of the folder as it widens at the downstream end of the folder as shown in FIG. 6D.

When the fabric is completely folded, two continuous belts 69 (FIG. 6) traveling at the same speed adjacent to one another can be used to nip the fabric and pull the fabric through a glue applicator 71. The glue applicator would insert glue along the bond line 54 (FIG. 2) between the two walls 42 and 44 along the side edges 65. Side pressure from the two belts 69 can then be used to close the walls 15 onto the line of glue to create a permanent bond. The preferred glue for this application is a Bostik 7983 manufactured by Bostik of Middleton, Mass. Misalignments in forming the vane as described may cause twisted or bowed vanes, so maintaining proper alignment of the web of fabric as it is folded and glued is important. It should be appreciated that the glue used in forming the vane has no roll in the functional characteristics of the vane but rather serves only to secure the vane material to itself. This could be achieved in other manners such as by sewing, stapling or clamping.

The folded and glued web in its tubular configuration can then be transferred to a cutting mechanism 73 (FIG. 6) to cut the web into desired lengths. One such mechanism is a conventional guillotine cutoff which may be a single-rotation-type guillotine that is spaced from the tubular web so that the folded and glued web can run through it freely and only impinges upon the vane when actual cutting occurs. The single rotation type cutter can produce any length vane 32. After the vane is cut to length, it would be accelerated away from the guillotine cutter to where the hanger plate 36 is incorporated into the vane as by ultrasonics or adhesives and subsequently forwarded for packaging or incorporation into the finished window blind product.

Another advantage to a vane 32 formed as shown in FIG. 2 is that the vane can be packaged in an almost completely collapsed state and the fabric at the rounded fold will cause the vane to rebound or open up when placed on a blind. The amount of rebound is dependent on the type of fabric used. A resilient fabric will open up fuller than a non-resilient fabric.

A first alternative embodiment of the vane of the present invention is illustrated in FIG. 7. The vane 58 of FIG. 7 in transverse cross-section can be seen to have a flat short wall 60 and an outwardly convex long wall 62. The structure also has a well defined permanent longitudinal crease 64 along a folded side 66, and a tail 68 along the other side where the short wall and the long wall are adhesively joined along a bond line 70 extending the full length of the vane. The advantage to this particular structure is that due to the fact that the vane material is somewhat biased toward a flat orientation, the long wall 62 exerts a lateral biasing force on the short wall 60 at the crease 64 and along the bond line 70 so that the short wall is always biased outwardly and thus remains flat. Additionally, the short wall prevents the long wall from extending outwardly beyond the width of the short wall thus preventing the long wall from collapsing on itself. These offsetting forces between the short and long walls help the structure retain its shape when hung in a vertical orientation. The convex long wall 62 is also seen to be rounded so as to simulate a rounded pleat found in conventional draperies. The spacing between the walls 60 and 62 of the vane at the location where they are maximally spaced, as with the first described embodiment, is designated by the letter "X" in FIG. 7 and is preferably in the range of ⅛" to 1" for a vane that is 3½" wide.

The embodiment of FIG. 7 is also preferably formed from an elongated web or strip of fabric. The permanent longitudinal crease 64 (FIGS. 8, 9 and 10) is established in any conventional manner in a central region of the web. The location of the crease is in the region where the tubular vane is folded, as shown in FIGS. 8, 9 and 10. There is no later heat setting of the crease, so it must be made permanent. In making the crease permanent, the fibers of the fabric web must be flattened without being cut. In the preferred embodiment of the vane, the flattening of the fibers occurs over a width of at least two times the thickness of the fabric web as best seen in FIGS. 9 and 10. A preferred thickness of the fabric would be 10½ mils. To achieve such a crease, a blunt creaser is used that has a contact area of at least two times the fabric thickness and compresses the fabric to about one half its normal thickness. This crease width is preferred, but the vane will function if the crease is narrower or wider.

The desire for a permanent crease as described is better understood by referring to FIGS. 9 and 10. FIG. 10 shows a fabric web at the point of the crease 64 while FIG. 9 shows what the crease looks like when the web is folded. It is clear from this illustration that instead of gaining a sharp fold line that may tear when folded, the crease provides for a gentle fold that does not have a sharp fold line. This relatively broad, blunt crease helps the material of the vane retain its airfoil configuration by providing more of a divergent bias on the sides or sections of the web defined by the crease than would exist with a narrower crease.

Figure 11:
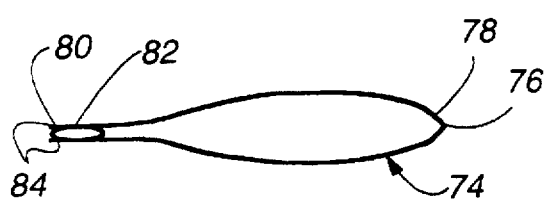
FIG. 11 is an end view of a second alternative embodiment of the vane.

A second alternative embodiment of the vane of the present invention is illustrated in FIG. 11. The vane 74 of FIG. 11 can be seen to be very similar to the first described embodiment of FIG. 2 except that a longitudinal crease 76 is formed in the fold along the associated side 78 of the vane. The crease 76 is preferably a blunt crease as of the type described in connection with the first alternative embodiment of FIG. 7 and extends substantially along the front vane section at the longitudinal center line of a web of fabric from which the vane is made. The side 80 of the vane opposite the creased side 78 again forms a relatively thin and flat tail or rear vane section 82 where the two side edges 84 of the web are bonded together.

Figure 12:
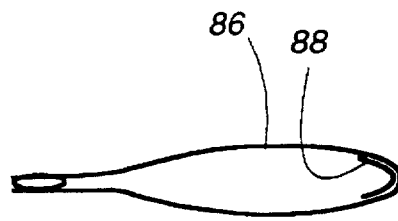
FIG. 12 is an end view of a third alternative embodiment of the vane.

To obtain more rebound, a vane 86 (FIG. 12) of the configuration shown in FIG. 2 can be modified by adding a strip 88 of resilient material longitudinally along a fold 90 on the inside of the vane 86 as illustrated in a third alternative embodiment in FIG. 12. The resilient strip 88 can be narrow or wide. An example of a resilient strip that is suitable for use in the vane is a 50 gram/m² 6 denier latex bonded polyester typical of that used as quilt battens and found in most fabric stores. Strips of the resilient material can alternatively be bonded to the fabric transverse to the longitudinal axis of the vane. These strips, if a resilient polymer is used, will provide cross-directional strength to the vane and work to force the vane open.

The fabrics used for the first, second and third alternative embodiments of the preferred invention illustrated in FIGS. 7, 11 and 12, respectively, are the same as those described for the embodiment of FIG. 2. Again, the most important attribute of the fabric is that it have diagonal, dimensional stability or memory. Another important attribute of the fabric is that it have a good hand. One particular fabric that works very well with these three embodiments is a laminate of a woven and nonwoven polyester. The methods of manufacturing the vanes are substantially the same as that for manufacturing the vane 32 of the first described embodiment.

Figure 15:
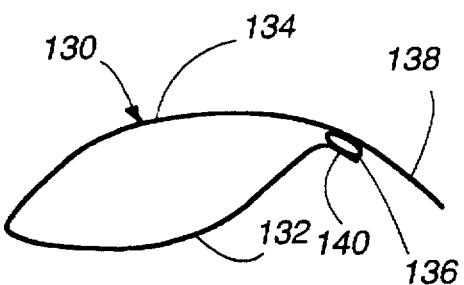
FIG. 15 is an end view of a sixth alternative embodiment of the vane.
Figure 13:
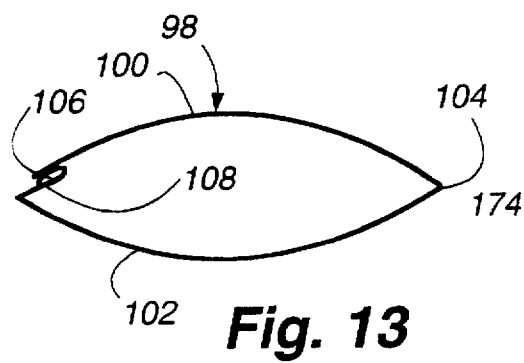
FIG. 13 is an end view of a fourth alternative embodiment of the vane.
Figure 14:
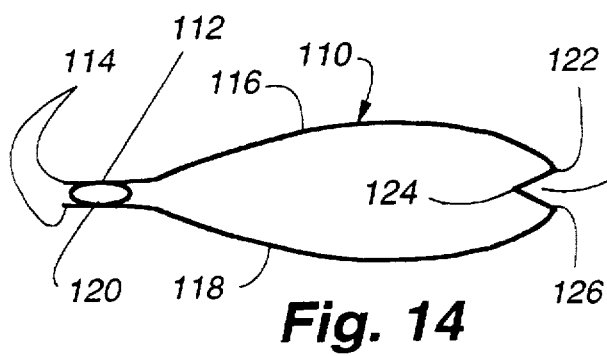
FIG. 14 is an end view of a fifth alternative embodiment of the vane.

FIGS. 13 through 15 show fourth, fifth and sixth alternate embodiments, respectively, of the vane shown in FIG. 11 but folded and creased differently. All three embodiments would again preferably be made of the same fabric as the previously described embodiments. The vane 98 shown in FIG. 13 does not have a tail, the walls 100 and 102 are symmetric with a crease 104 along a central region of the web from which the vane is formed and a bond line 106 extending the full length of the vane is located between the side edge of one wall 100 and an internally folded flap 108 at the side edge of the other wall 102. The general cross-sectional shape of the vane 98 is obloid. One advantage of this design is that the bonding area is hidden.

FIG. 14 represents a vane 110 that has a tail 112 defined by bonded flat legs 114 along the side edges of each wall 116 and 118 respectively. A bond line 120 extends the full length of the vane. The walls 116 and 118 are of equivalent width as are the flat legs 114. The walls are equally bowed and terminate substantially along the longitudinal center line of the web in three longitudinally extending creases 122, 124 and 126 which define a longitudinally extending indentation 128. The creases bias the vane toward an open condition should it be collapsed.

FIG. 15 represents a vane 130 that has a convex short wall 132 and a convex long wall 134. The short wall 132 is bonded or otherwise affixed to the long wall 130 with a line of adhesive 136 extending the full length of the vane at an intermediate location along the width of the long wall so as to define a single layer tail 138 along the free edge of the long wall. The opposite side edge of the vane is folded with or without a crease to define a flap on the short wall that identifies the location on the short wall where it is bonded to the long wall. This embodiment improves vane closure as the tail 138 establishes a greater overlap between vanes when the vanes are in the closed position.

FIGS. 16 through 19 show seventh, eighth, ninth and tenth alternate embodiments, respectively, of the vane of the present invention. These embodiments are made from multiple webs of material instead of a single web. The embodiments all utilize a fabric with diagonal dimensional stability or memory, they all are of tubular structure, and they have a similar if not identical appearance to earlier described embodiments. The advantage to a multiple web type of structure is that it may be possible to use two webs of different colors, textures, or even different materials to create a vane. With webs of different materials, there may be differential shrinkage between the two types of materials resulting in vane bowing. Thus preshrinkage of the raw web materials prior to manufacture of the vane is desirable.

Figure 16:
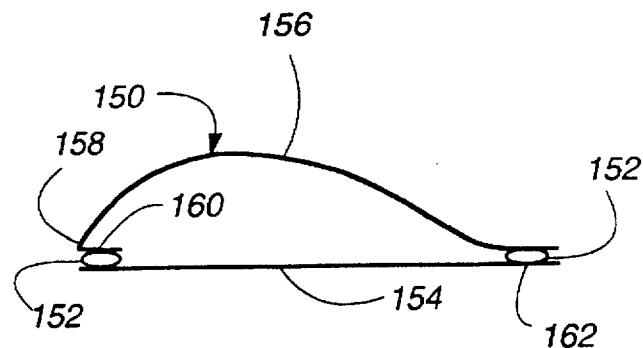
FIG. 16 is an end view of a seventh alternative embodiment of the vane.

The seventh embodiment shown in FIG. 16 is a multiweb vane 150 that has a shape similar to the shape of the vane shown in FIG. 7. This vane is made of two individual webs of materials joined together by lines of adhesive 152 extending the full length of the vane to form a substantially flat short wall 154 and a convex long wall 156 of the tubular vane. The long wall 156 is longitudinally creased inwardly at a fold 158 adjacent one longitudinal edge to define a flap 160. The flap 160 is tucked inwardly and bonded with the adhesive 152 to the short wall 154. The opposite edges of walls 154 and 156 are also bonded together with the adhesive 152 to form a tail 162.

Figure 17:
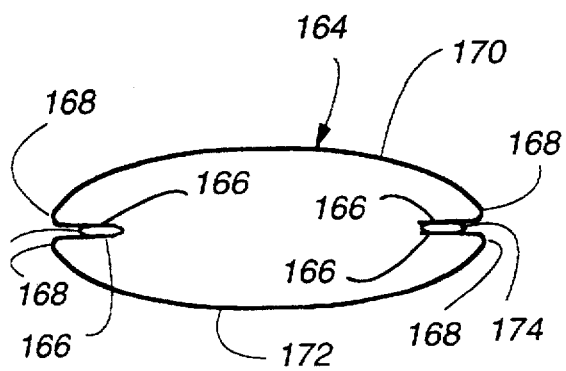
FIG. 17 is an end view of a eighth alternative embodiment of the vane.

The eighth alternative embodiment shown in FIG. 17 represents a symmetrical multiweb vane 164 having internal flaps 166 defined by creases 168 adjacent opposite edges of the equal length convex walls 170 and 172 of the web. The flaps 166 are joined together with adhesive 174 extending the full length of the vane.

Figure 18:
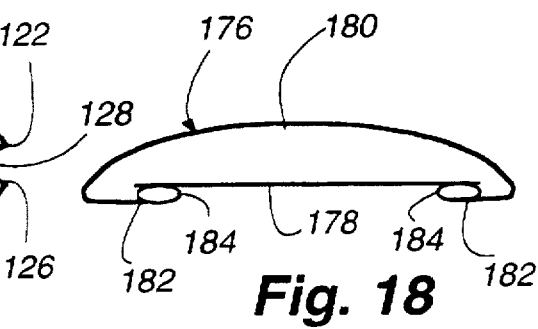
FIG. 18 is an end view of an ninth alternative embodiment of the vane.

FIG. 18 represents a multiweb vane 176 in which a substantially flat short wall 178 is contained within a convex long wall 180 having inwardly directed flaps 182 along opposite side edges formed by creasing. The flaps 182 have an inner surface facing the short wall and the short wall is bonded to the inner surface of the flaps 182 of the long wall with adhesive 184 extending the full length of the vane.

Figure 19:
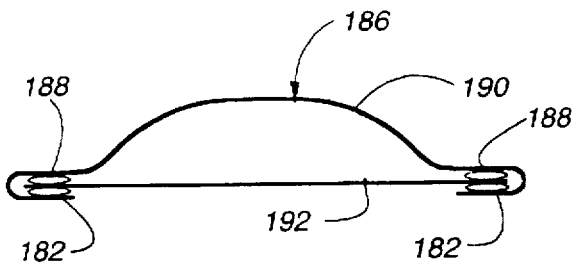
FIG. 19 is an end view of a tenth alternative embodiment of the vane.

The tenth alternative embodiment illustrated in FIG. 19 shows a multiweb vane 186 that is a variant of the vane 176 shown in FIG. 18. The difference in the vane 186 and the vane 176 disclosed in FIG. 18 is an additional set of glue lines 188 extending the full length of the vane bonding the long wall 190 to the short wall 192 along a portion of the long wall adjacent to flaps 182 so that the short wall is bonded to the long wall on both faces of the short wall.

FIGS. 20 through 23 represent multicellular embodiments of the vane of the present invention. These vanes may include two or more cells, but it is still desirable that the fabric have diagonal dimensional stability or memory to optimize proper functioning. A cell divider may be made of the same or different materials. A cell divider may be used both to create multiple cells or to provide blackout or darkening features to the vane product. The vanes may be made using multiple webs or made using a single web and folding the web differently. The cell divider when inserted between the vane edges helps to prevent collapsing of the vane, but it does not have to be inserted between the edges. By making the cell divider from a material different than the body of the vane, it can be used to increase the bending stiffness of the vane by using a stiffer material or to enhance other physical properties such as internal light or heat reflection.

Figure 20:
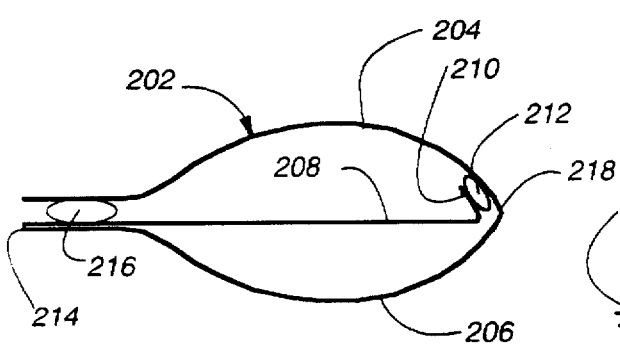
FIG. 20 is an end view of an eleventh alternative embodiment of the vane.
Figure 21:
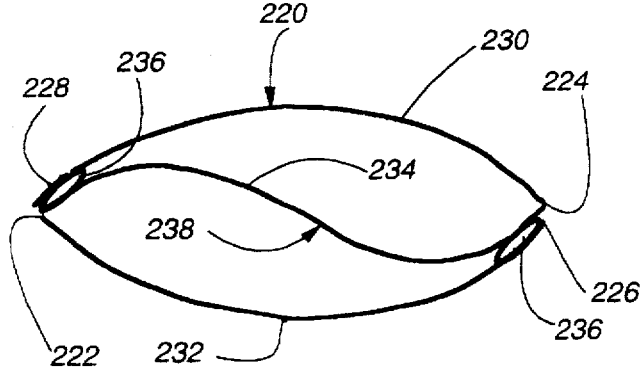
FIG. 21 is an end view of a twelfth alternative embodiment of the vane.
Figure 22:
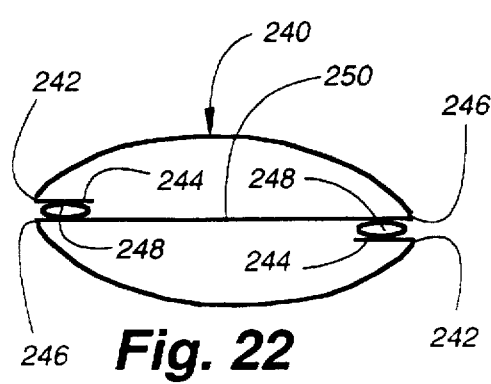
FIG. 22 is an end view of a thirteenth alternative embodiment of the vane.

FIGS. 20 through 22 represent multicellular vanes that are folded differently but made from a single web. In FIG. 20, a vane 202 constituting an eleventh alternative embodiment of the present invention can be seen to be formed from a single strip of material having equal length convex wall portions 204 and 206 and a flat cell divider portion 208. The wall portion 204 and 206 define an external structure configured substantially the same as that of FIG. 11. The cell divider portion 208 is flat and has a flap 210 at one edge, which is also one side edge of the web from which the vane is made, bonded with adhesive 212 to the internal closed end of the vane along the full length of the vane. The opposite edge of the cell divider portion which is actually a fold line 214 is bonded with adhesive 216 along a bond line extending the full length of the vane that secures the opposite edge of the cell divider portion to the two walls of the vane. The wall 204 is defined between the other side edge of the web from which the vane is made and a first creased fold line 218 while the second wall 206 is defined between the first fold line 218 and the second fold line 214. The cell divider is then of course formed between the second fold line 214 and the flap 210.

The twelfth alternative embodiment shown in FIG. 21 is also a multi-cellular vane 220 fabricated from a single web. The web is creased along two longitudinal fold lines 222 and 224 which are equally spaced from opposite edges 226 and 228 respectively of the web. The fold lines, however, are spaced apart from each other a greater distance than they are from each adjacent edge of the web. The vane 220 is then formed by folding the outermost sections 230 and 232 of the web (the sections between the fold lines and the outer edges of the web) in opposite directions so as to overlap on opposite sides the intermediate portion 234 of the web between the fold lines. The opposite edges 226 and 228 of the web are then bonded with adhesive 236 to the intermediate portion 234 along the full length of the vane adjacent to the longitudinal fold lines so as to form the vane as illustrated with a generally S-shaped divider 238. It will be appreciated that the divider 238 is longer than either wall defined by the outermost sections 230 and 232 and therefore biases the walls outwardly into the desired configuration.

FIG. 22 is an illustration of the thirteenth alternative embodiment of the invention and can be seen to have an external configuration similar to the embodiment of FIG. 17. The vane 240 is a multi-cellular vane, however, and is fabricated from one web that has four longitudinal creases. Two outermost creases 242 are spaced slightly inwardly from the longitudinal edges of the web so as to define short flaps 244. Two inner longitudinal creases 246 are equally spaced from the outer creases 242, but the spacing between the inner creases is less than the spacing between associated inner and outer creases. The flaps 244 are folded inwardly and bonded with adhesive 248 along the full length of the vane to the section of the web between the innermost creases 246 so as to form a vane having convex walls of equal length and a flat intermediate cell divider 250.

Figure 23:
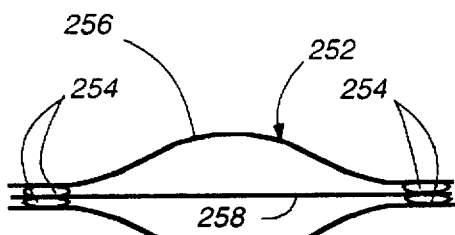
FIG. 23 is an end view of a fourteenth alternative embodiment of the vane.

FIG. 23 shows the fourteenth alternative embodiment of the vane of the present invention, and the vane 252 can be seen to be made from three webs that are bonded together with adhesive 254. Two outermost webs are of equal width and define convex outer walls 256 of the vane. The outer walls 256 have sandwiched therebetween a shorter web or cell divider 258 that is of flat configuration with the shorter web being bonded to the outer walls with the adhesive 254 adjacent to the longitudinal edges of the web and the walls along the full length of the vane. One advantage of a multi-web construction as illustrated in FIG. 23 is that different fabrics or films may be used in the construction of the vane. For example, the vane may have as its cell divider 258 a sheet of metalized polyester film that gives the product roomdarkening capabilities. Because the walls 256 of the vane are of equal width, i.e. symmetric, the different material characteristics will not affect vane bowing. Thus, blackout materials, insulating materials or sound-deadening materials may be added to the vane construction without an adverse affect on vane performance.

Figure 24:
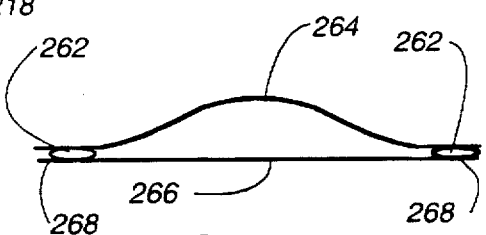
FIG. 24 is an end view of a fifteenth alternative embodiment of the vane.

A fifteenth alternative embodiment of the invention is illustrated in FIG. 24 and can be seen to be made from two webs bonded together with adhesive 262 along the full length of the vane. The webs are joined so as to define a convex long wall 264 and a flat short wall 266 with relatively thin tails 268 defined at the side edges of the webs where they are bonded together. The convex curvature of the long wall 264 advantageously tends to keep the short wall 266 taught and flat.

Figure 25:
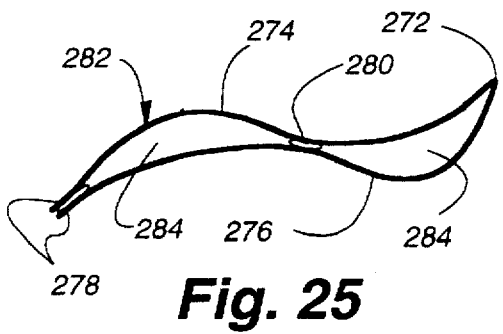
FIG. 25 is an end view of a sixteenth alternative embodiment of the vane.

FIG. 25 illustrates a sixteenth embodiment of the invention. In this embodiment, a single web or strip of material is folded and creased at 272 substantially along a longitudinal centerline and the two halves of the web defined on either side of the crease 272 are formed into S-shaped configured walls 274 and 276 which are interconnected as by bonding with adhesive along the contiguous side edges 278 and along a mid line 280 between each side edge 278 and the crease 272. A curved vane 282 that is also S-shaped in configuration is thereby formed with two crescent shaped cells 284.

It will be appreciated that the vane shape, number of cells and number of webs or strips used to manufacture a vane can vary. The two most important features of the vane, however, remain that it be tubular in construction, i.e., it be hollow in one or more of its cells, and that the vane preferably be made of a fabric or a material that has diagonal dimensional stability even though materials having diagonal dimensional memory would also work satisfactorily. The spacing between the outer walls for any of the alternative embodiments is preferably in the range of ⅛" to 1" at their maximum displacement.

To illustrate the advantages gained by producing vanes in a tubular configuration as described hereinabove and from materials having diagonal, dimensional stability or memory, the results of tests comparing standard typical vanes found in the art with those of the present invention are presented in FIGS. 26 and 28.

For purposes of the tests from which the data was obtained, the vanes were cut to be 84 inches in length and 3.5 inches wide. The vanes were suspended from the top edge with centrally located clips approximately ⅛ inch in width and measurements were made to determine the force that had to be applied at the opposite lower free bottom edge of the vane to twist the opposite or bottom edge of the vane through varying degrees. This force is referred to herein as the torque index.

Figure 27:
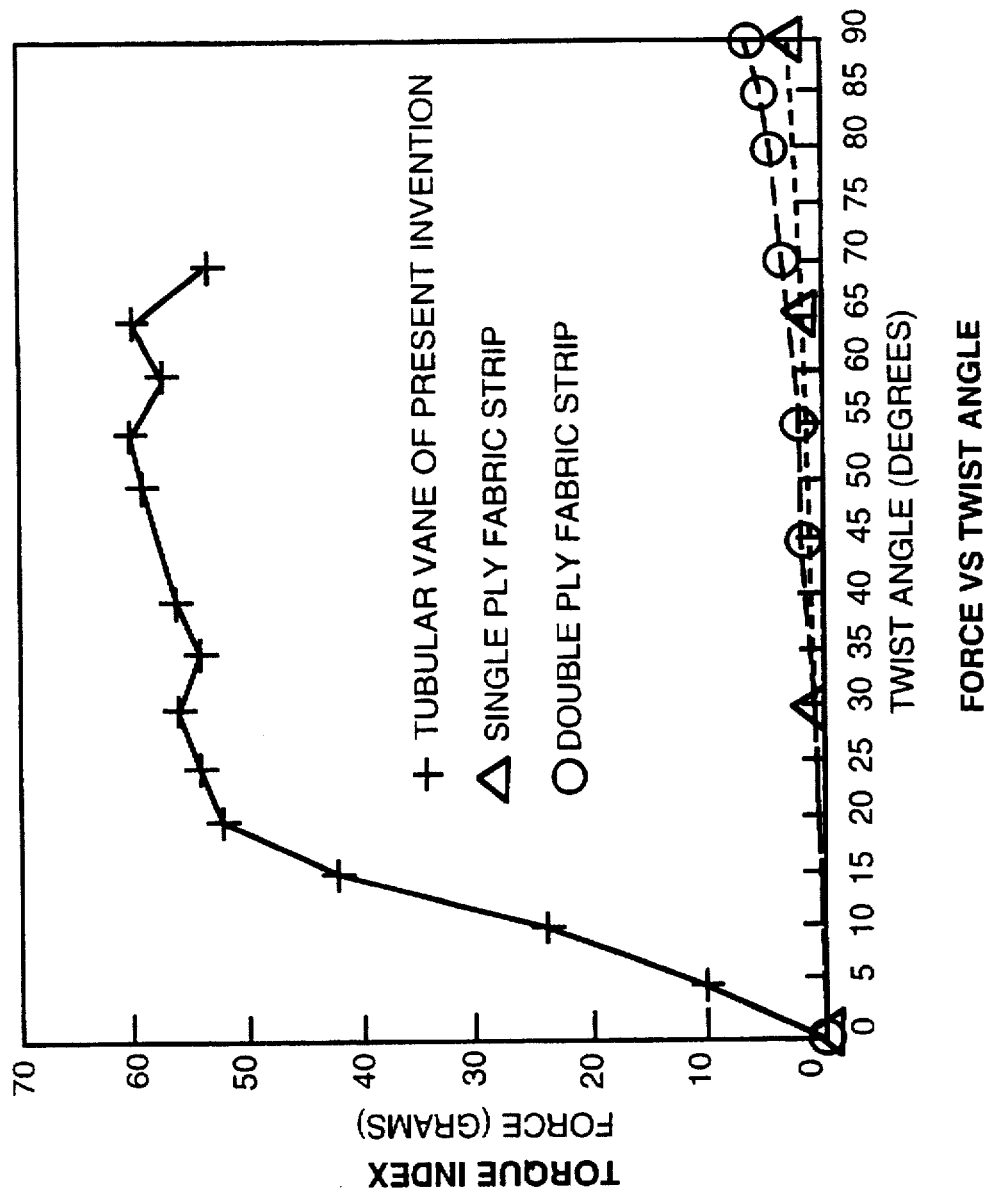
FIG. 27 is a graph corresponding to the tabular information of FIG. 26.

The first test compared a single-ply and double-ply planar prior art type vane to a tubular vane made in accordance with FIG. 7 of the present invention wherein the vanes were all made from a 100 gram/m² acrylic bonded polyester spun bond nonwoven fabric manufactured by Unitika Corporation of Japan. The test results are shown in FIG. 26. The amount of force required to twist the lower edge of the vanes through the designated number of degrees is recorded in the three tables of FIG. 26. It will there be seen that the force required to rotate a non-tubular, single-ply fabric vane through 45 degrees, for example, is approximately 1.5 grams. The force required to rotate a non-tubular, 2-ply fabric vane through 45 degrees is slightly more than 1.5 grams. In contrast, the force required to rotate a tubular vane constructed in accordance with the present invention through 45 degrees is 59 grams, therefore illustrating the vastly improved resistance to torque obtained by a tubular vane constructed in accordance with the present invention. A graph illustrating the comparative data set forth in FIG. 26 is shown in FIG. 27.

The advantages obtained from utilizing material having diagonal, dimensional stability relative to material that does not have such stability is illustrated in data presented in FIG. 28. FIG. 28 has two tables, one directed to a tubular vane configured as shown in FIG. 7 made of a woven fabric and specifically a woven slub polyester, which fabric does not have diagonal, dimensional stability or memory and an identically configured tubular vane made of a polyester knit fabric, that does have diagonal dimensional stability. Both fabrics were of equal weight.

Figure 29:
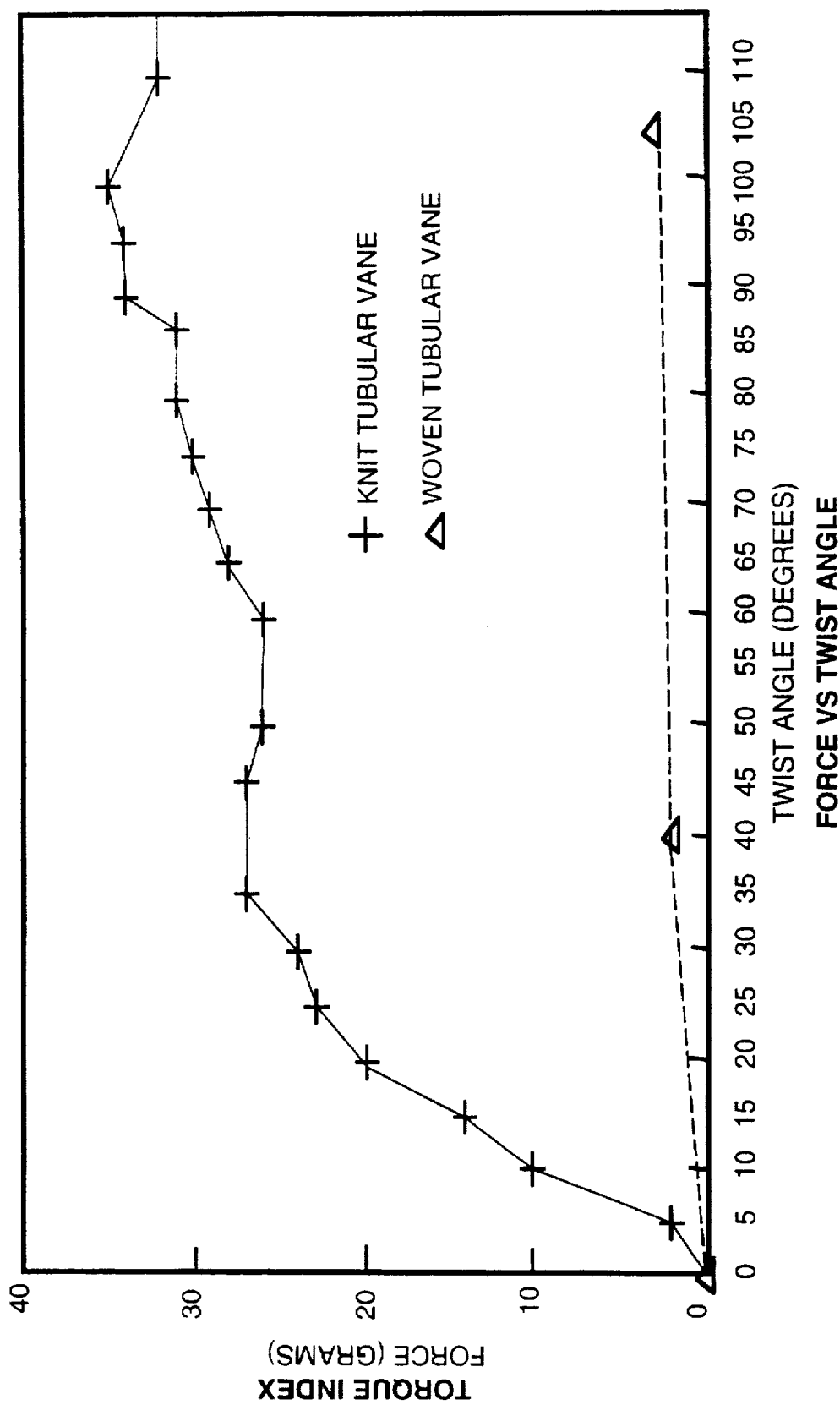
FIG. 29 is a graph corresponding to the tabular information of FIG. 28.

In looking at the tabular information in FIG. 28, it will be appreciated that the force required to rotate a woven fabric tubular vane without diagonal, dimensional stability or memory through 45 degrees is just less than 2 grams of force. On the other hand, the force required to rotate a tubular knit fabric vane having diagonal, dimensional stability through 45 degrees is 26 grams. Accordingly, a dramatic difference in force necessary to rotate the vane through 45 degrees is illustrated showing that materials having diagonal, dimensional stability are far preferable for use in a vane. A graph illustrating the comparison between the knit fabric having diagonal, dimensional stability and a woven fabric not having such stability is illustrated in FIG. 29.

It will be appreciated from the above information that the structural configuration of the vane and the fabric from which it is made have a significant bearing on the vanes torsional resistance to twisting. While the torque index of the vane may have varying importance to a manufacturer or consumer, applicant has found vanes to be desirable that have a torque index in excess of 10 grams for 45 degrees of rotation when the vanes are 84 inches in length and 3.5 inches wide.

As an alternative to the hangar plate 36 shown in FIG. 2, the top or upper end of a vane 290 can be closed as shown in FIGS. 31 and 32 so that the two outer walls 292 of the vane are bonded together with a plastic insert 294 sandwiched therebetween. An end forming apparatus 296 for forming the top of a vane 290, as illustrated in FIG. 31, is shown in FIGS. 30 and 30A.

As can be seen in FIG. 30, a guide rail 298 having a groove 300 in an upper surface thereof is provided at the outlet end of the apparatus shown diagrammatically in FIG. 6 to guide a preformed and cut vane 290 to the end forming apparatus. A die set 302 is positioned immediately adjacent the end of the guide rail 298 for cutting the end of the vane into a predetermined configuration and a reinforcing strip inserting system 304 is aligned with the die set and guide rail for the purpose of selectively inserting a strip 306 of plastic material into the open top end of the vane. The inserting system 304 includes a sword 308 having a longitudinal cavity therethrough that slidingly receive the strip 306 of plastic insert material. The sword can be inserted into the open leading end of the vane to facilitate insertion of the plastic strip into the vane. Feed rollers 310 are part of the inserting system for advancing the strip of plastic, which may be polycarbonate, through the sword. Adhesive treators 312 are also provided for preapplying double faced adhesive tape 314 to the strip of plastic and removing the paper overlay commonly used on such tape before it is fed into the inserting system.

The die set 302 is somewhat conventional in including a pair of die blocks 316 with one having a cutter head 318 with a cutting edge 320 in a predetermined form so as to cut the top end of a vane as shown in FIG. 31 in a manner to be explained later. This configuration for the top end of the vane has been found to be desirable in an architectural covering of the type disclosed in copending application Ser. No. 08/437,959, filed simultaneously herewith entitled An Improved Fabric for an Architectural Covering and Method and Apparatus of Manufacturing Same, which is of common ownership with the present application and herein incorporated by reference. The die blocks 316 are simultaneously moved toward and away from each other by a somewhat conventional die set controller 322 which has a drive shaft 324 for rotating a crank arm 326 and effecting movement of push pull rods 328 connected to the crank arm at diametrically opposed locations. One push pull rod is connected to one of the die blocks while the other is connected to the opposite die block. Selective rotation of the drive shaft thereby causes the blocks to move toward each other when it is desired to cut the end of an incoming vane or away from each other after a cutting operation. The die blocks also include, as seen in FIGS. 30, 33 and 34, a photo electric sensor 330 for sensing the top end of an incoming vane to effect termination of the forward movement of the vane in a manner which is well within the skill of the art.

The plastic inserting system 304 is adapted to receive and process the elongated strip 306 of plastic with the strip having been pretreated with a pair of the doublefaced strips of adhesive tape 314 on each face. The two strips of adhesive tape on each face are spaced a small amount from the longitudinal center of the plastic strip so as to define a gap therebetween. Pairs of driven stripping pinch rollers 332 cooperate with an idler roller 334 on each side of the plastic strip to remove the paper overlay 336 conventionally used on double faced adhesive tape. In other words, one face of the adhesive tape is prebonded to the plastic strip 306 in a conventional manner while the opposite or exposed face of the adhesive tape has a removable paper overlay 336. The removable paper overlays on each side of the plastic strip are initially wrapped around the idler roller 334 and returned between the stripping pinch rollers 332 which are selectively activated with the operation of the apparatus to peel the paper overlays from the adhesive as desired.

The plastic strip 306 is fed into the inlet end 338 of the strip inserting system 304 from the adhesive treators 312 and protrudes through a main body 340 and the sword 308 of the inserting system for insertion into the open top end of an aligned vane 290. The main body 340 of the inserting system has a sheath 342 comprised of a pair of flat plates 344 having aligned longitudinally extending slots 346 therethrough. The slots are in alignment with the gap between the strips of adhesive tape on the plastic strip 306 positioned within the sheath. The feed rollers 310 are disposed on opposite sides of the sheath and in alignment with the slots 346 so as to operatively engage and pinch the plastic strip therebetween. At the outlet end 348 of the inserting system the sword 308 protrudes from the sheath 342. The sword, however, extends completely through the sheath. It has a pair of parallel plates 350 protruding from the outlet end of the sheath and upper and lower integral guide tracks 352 within the sheath as best seen in FIGS. 40 and 41. The guide tracks are continuous with the plates 350 and serve to guide the plastic strip 306 through the main body 340 of the plastic strip inserting system. The plates 350 at the outlet end of the sword confine the strip so as to deliver the lead end of the strip to the die set 302.

The main body of the plastic strip inserting system 304 includes a reciprocating base 354, a slide rail 356 and support blocks 358. The support blocks are connected to a push pull cylinder 360 at the inlet end 338 of the inserting system which is adapted to selectively advance and retract the inserting system in sequence with the other components of the apparatus.

Before describing the operation of the apparatus, it is to be appreciated that the cutter 73 shown in FIG. 6 would be replaced with a cutter 362 as shown in FIG. 30A which has a pair of closely spaced rollers 364 and 364b with one of the rollers 364a having a cutting edge 366 as in the cutter 73 and a square hole punch 368 adapted to cut a square hole 370 at approximately the longitudinal center line of a vane 290 as the vane is being cut into predetermined lengths within the apparatus shown diagrammatically in FIG. 6. Accordingly, as the lead or top end of the vane approaches the die set 302 as shown in FIG. 30, a square hole 370 has already been formed in the vane.

The sequence of operation for forming the end of a vane is probably best illustrated in FIGS. 35-37 with FIG. 35 showing the position of the machine before any steps are taken. It will be appreciated that the inserting system 304 is fully retracted away from the die set 302 and the vane 290 has not as yet been introduced to the die set.

The initial step in forming the top end of a vane is the activation of the push pull cylinder 360 which advances the inserting system 304 forwardly until the outlet end of the sword 308 with the plastic strip 306 therein is positioned between the die set blocks 316 and slightly past the cutter head 318. The sword is longitudinally aligned with the groove 300 in the top of the guide rail 298 so as to also be aligned with an incoming vane. A vane 290 is then delivered between the die set blocks so that the open leading end of the vane is received upon and straddles the leading end of the sword thereby positioning not only the outlet end of the sword but also the plastic strip that is retained therein within the open top end of the vane. The push pull cylinder 360 is next retracted to pull the sheath and sword rearwardly so as to remove the sword from the confines of the vane. The feed rollers 310 of course have a continuous grip on the plastic strip and serve to hold the lead end of the plastic strip within the open end of the vane. This position is shown in FIG. 37 and it will be appreciated that the plastic strip is now positioned within the open top end of the vane and between the die blocks.

The photo electric sensor 330 in the die blocks 316 is positioned above the sword 308 so as to be capable of sensing the open top end of a vane while the sword is protruding between the die blocks. The photo electric sensors cooperate with drive rollers (not shown) for the vanes which advance the vanes along the guide rail 298 and stop the vanes with the square hole 370 therethrough, in alignment with a notch 372 (FIG. 42) in the cutter blade 320. The die set controller 322 is then activated to move the die blocks toward each other so that the end of the vane is cut off with the cutter blade 320 into the configuration shown in FIG. 31. Since the square hole 370 in the vane is aligned with the notch 372 in the cutter blade (FIG. 42), the top end of the vane is cut so as to allow a tab 374 formed on the plastic strip 306 to protrude from the end of the vane. During the cutting operation, the tab is also punched to provide a transverse passage 376 therethrough which facilitates the attachment of the vane to a hanger or other component (not shown) of an operating system for an architectural covering utilizing the vane.

As an alternative to cutting a square hole in the vane in order to provide the exposed tab on the plastic strip at the end of the vane, the vane can merely be slit in lieu of being punched with a square hole and obtain the same results. By reference to FIGS. 30B, 43A and 44A, it will be seen that the cutter 362 having rollers 364A and 364B would be modified by replacing the square hole punch 368 with a straight edge punch which would merely form a slit through the vane in lieu of the square hole. Subsequently, when the die blocks are moved towards each other so that the vane end is cut with the cutter blade 320 into the configuration shown in FIG. 31, tabs of fabric on either side of the plastic tab will be released as shown in FIG. 44A thereby obtaining the desired end of the vane as shown in FIG. 31.

The die blocks 316, simultaneously with the cutting of the end of the vane, compress the sides of the vane against the adhesive tape 314 on the plastic strip so as to adhere the sides walls of the vane to the plastic insert 294 thereby sandwiching the plastic insert between the walls 292 and closing the end of the vane. Finally, the die set controller 322 can again be activated to retract the die blocks leaving the vane free to be withdrawn by reverse movement of its drive rollers from between the blocks leaving the vane desirably formed with the reinforcing plastic insert 294 secured and protruding from the end of the vane.

The end of the vane can also be formed as shown in FIG. 32, wherein the walls 292 of the vane protrude upwardly and cover the plastic tab as at 378. This is very simply accomplished by not providing the square hole 370 in the vane as it is delivered to the end forming apparatus. In forming the end of the vane as shown in FIG. 32 instead of preapplying a pair of double faced strips of adhesive tape 314 to each side of the plastic reinforcing strip, a single relatively broad strip of adhesive tape (not shown) would be utilized which covered the central region of the plastic strip 306 so as to satisfactorily bond the walls 292 of the vane to the plastic strip even along the protruding tab 374. While the feed rollers 310 in the inserting system 306 will engage the adhesive tape, it has been found that by using low coefficient of friction surfaces on the feed rollers, the system will not be adversely affected.

While the present invention has been disclosed in connection with a preferred embodiment thereof and several alternate embodiments, it should be understood that there may be many other embodiments which fall within the spirit and scope of the invention as defined by the following claims.

What is claimed is:

1. An architectural covering comprising:
   a) a plurality of vertically oriented, separate, elongated hollow vanes suspended along a path in horizontally spaced relationship to each other;
   b) each vane being defined by a hollow body having a tubular shape, an upper end by which it is suspended, a lower end, and wall sections extending between said ends and defining a width of each said vane, at least one of said wall sections being arcuate;
   c) said hollow body being constructed solely of at least one piece of flexible material and being oriented to define both said tubular shape and said wall sections and to further define longitudinally extending front and rear vane sections and such that the body will inherently bend transversely of its lenght if the body were disposed horizontally;
   d) said flexible material having opposing longitudinal, free edges being joined together along at least one line extending longitudinally of said front and rear vane sections from said upper end to said lower end of said hollow body; and
   e) the wall sections being spaced from each other between said front and rear vane sections and the space therebetween being uninterrupted over a major portion of its length and width.

2. The architectural covering according to claim 1 wherein:
   a) the flexible material has a machine direction along which it has been formed and a cross direction extending at a right angle to said machine direction; and
   b) said machine direction extends from the upper end to the lower end of said hollow body.

3. The architectural covering according to claim 2, wherein said flexible material is diagonally, dimensionally stable relative to said machine and cross directions.

4. The architectural covering according to claim 2, wherein said flexible material has diagonal dimensional memory relative to said machine and cross directions.

5. The architectural covering according to claim 3, wherein said tubular body is constructed of two pieces of said flexible material, each of which defines one of said wall sections.

6. The architectural covering according to claim 3, wherein:
   a) said tubular body is constructed of three pieces of flexible material;
   b) each of said pieces has a width as measured between its opposite edge portions; and
   c) said pieces are joined together along their opposite edge portions to define a vane with opposite outer wall sections and a divider disposed internally of said tubular body and dividing said tubular body into two sub-sections.

7. The architectural covering according to claim 6, wherein:
   a) said opposite outer wall sections are convexly oriented with respect to each other; and
   b) said divider extends substantially flat between said opposite edge portions.

8. The architectural covering according to claim 3, wherein said body is constructed of a single piece of said flexible material having opposite first and second edge portions.

9. The architectural covering according to claim 8, wherein said wall sections are convexly oriented with respect to each other between said front and rear vane sections and define opposite outer wall sections of said tubular body.

10. An architectural covering comprising:
    a) a plurality of vertically oriented, separate, elongated hollow vanes suspended along a path in horizontally spaced relationship to each other;
    b) each vane being defined by a hollow body having a tubular shape, an upper end by which it is suspended, a lower end, and first and second outer wall sections extending between said ends and defining a width of each said vane, at least one of said wall sections being arcuate;
    c) said hollow body being constructed solely of at least one piece of flexible material having opposite sides and first and second edge portions and being folded over upon itself to define both said tubular shape and said wall sections and to further define longitudinally extending front and rear vane sections and such that the body will inherently bend transversely of its lenght if the body were disposed horizontally;
    d) said flexible material having opposing, longitudinal, free edge being joined together along at least one line extending longitudinally of said front and rear vane sections from said upper end to said lower end of said hollow body; and
    e) the wall sections being spaced from each other between said front and rear sections and the space therebetween being uninterrupted over a major portion of it length and width.

11. The architectural covering according to claim 10, wherein one outer wall section, as measured from said front vane section to said rear vane section, is shorter than the other outer wall section.

12. The architectural covering according to claim 10, wherein the outer wall sections, as measured from said front vane section to said rear vane section, are equal in width.

13. The architectural covering according to claim 10, wherein said front vane section is smoothly curved in connecting said outer wall sections together.

14. The architectural covering according to claim 13, wherein said front vane section includes a resilient material bonded to it, said resilient material urging said outer wall sections into said spaced relationship.

15. The architectural covering according to claim 10, wherein said front vane section is creased from said upper end to the lower end of the tubular body.

16. The architectural covering according to claim 15, wherein said crease is defined by an area internally of said tubular body in which said material is compressed, said area extending along said front vane section and having a width of about twice the thickness of said material.

17. The architectural covering according to claim 15, wherein:
    a) said front vane section includes three creases extending from the upper end to the lower end of said tubular body; and
    b) said flexible material is oriented at said creases to define an inwardly directed notch along said front vane section.

18. The architectural covering according to claim 3, wherein said material is a nonwoven fabric.

19. The architectural covering according to claim 3 or 10, wherein said material is a knit.

20. The architectural covering according to claim 3 or 10, wherein said material is a laminate of a woven and nonwoven polyester.

21. The architectural covering according to claim 3 or 10, wherein the flexible material has a degree of flexibility whereby a vane of about eighty-four inches in length from said upper end to said lower end, and suspended against rotation at its upper end with the lower end free, requires a twisting force applied to its lower end of between about 10 and 60 grams.

22. The architectural covering according to claim 3 or 10, wherein each of said vanes is suspended in said spaced relationship for pivoting movement about a vertical axis from a first open position with the front vane section of each vane facing substantially perpendicular to said path and a second closed position with the front vane section of each vane overlapping the rear vane section of a next adjacent vane in shingle-like, touching formation.

23. An architectural covering comprising:
 a) a plurality of vertically oriented, separate, elongated hollow vanes suspended along a path in horizontally spaced relationship to each other;
 b) each vane being defined by a hollow body having a tubular shape, an upper end by which it is suspended, a lower end, and wall sections extending between said ends;
 c) said hollow body being constructed solely of one piece of flexible material and being oriented to define both said tubular shape and said wall sections and to further define longitudinally extending front and rear vane sections and such that the body will inherently bend transversely of its length if the body were disposed horizontally;
 d) said flexible material having opposing, longitudinal, free edge being joined together along at least one line extending longitudinally of said front and rear vane sections from said upper end to said lower end of said hollow body;
 e) the wall sections being spaced from each other between said front and rear sections;
 f) said flexible material having a machine direction along which it has been formed and a cross direction extending at right angles to said machine direction; g) said machine direction extending from the upper end to the lower end of said hollow body;
 h) said flexible material being diagonally, dimensionally stable relative to said machine and cross directions;
 i) said single piece of flexible material having opposite first and second edge portions;
 j) said wall sections being convexly oriented with respect to each other between said front and rear vane sections and defining opposite outer wall sections of said tubular body; and
 k) wherein one outer wall section, as measured from said front vane section to said rear vane section is shorter than the other outer wall section.

24. An architectural covering comprising:
 a) a plurality of vertically oriented, separate, elongated hollow vanes suspended along a path in horizontally spaced relationship to each other;
 b) each vane being defined by a hollow body having a tubular shape, an upper end by which it is suspended, a lower end, and wall sections extending between said ends;
 c) said hollow body being constructed solely of one piece of flexible material and being oriented to define both said tubular shape and said wall sections and to further define longitudinally extending front and rear vane sections;
 d) said flexible material being joined together along at least one line extending longitudinally of said front and rear vane sections from said upper end to said lower end of said hollow body;
 e) the wall sections being spaced from each other between said front and rear sections;
 f) said flexible material having a machine direction along which it has been formed and a cross direction extending at right angles to said machine direction;
 g) said machine direction extending from the upper end to the lower end of said hollow body;
 h) said flexible material being diagonally, dimensionally stable relative to said machine and cross directions;
 i) said body single piece of flexible material having opposite first and second edge portions;
 j) said wall sections being convexly oriented with respect to each other between said front and rear vane sections and defining opposite outer wall sections of said tubular body;
 k) a first fold spaced from said first edge portion and located along said front vane section;
 l) a second fold substantially equally spaced from said second edge portion and located along said rear vane section;
 m) said first edge portion being joined to said flexible material along said second fold; and
 n) said second edge portion being joined to said flexible material adjacent said first fold so as to define a longitudinally extending divider dividing the tubular body into two sub-sections.

25. The architectural covering according to claim 24, wherein:
 a) said second edge portion is folded back along a third fold over said flexible material to define a flap along said second edge portion; and
 b) said flap is joined to said flexible material internally of said tubular body.

26. The architectural covering according to claim 25, wherein the spacing between said first edge portion and said first fold is substantially equal to the spacing between said folds so that said divider is substantially flat.

27. The architectural covering according to claim 24, wherein the spacing between said folds is greater than the spacing between each fold and the associated edge portion of the flexible material so that said divider is generally S-shaped in cross-section.

28. The architectural covering according to claim 24, wherein:
 a) each edge portion is folded back over said flexible material to define longitudinally extending first and second flaps along said first and second side edge portions, respectively;
 b) said first flap is secured to said flexible material adjacent said second fold; and c) said second flap is secured to said flexible material adjacent said first fold.

29. The architectural covering according to claim 28, wherein said folds are spaced apart a shorter distance than their spacing from the associated edge portions such that said divider is substantially flat.

30. The covering of claim 1 wherein the maximum spacing between said wall sections is in the range of ⅛ inch to 1 inch.

31. The covering of claim 30 wherein said width of said vanes is approximately 3½ inches.

32. The covering of claim 1 wherein said flexible material has a thickness of approximately 10½ mils.

33. The covering of claim 1 wherein only one of said wall sections is arcuate.

34. The covering of claim 1 wherein two of said wall sections are arcuate.

35. The covering of claim 1 wherein only two wall sections extend between said ends and wherein both said wall sections are arcuate.

* * * * *

UNITED STATES PATENT AND TRADEMARK OFFICE
CERTIFICATE OF CORRECTION

PATENT NO. : 5,797,442  Page 1 of 1
APPLICATION NO. : 08/639889
DATED : August 25, 1998
INVENTOR(S) : Colson et al.

It is certified that error appears in the above-identified patent and that said Letters Patent is hereby corrected as shown below:

On the title page: Item [75]
The list of inventors should read as follows:

Inventors: Wendell B. Colson, Weston, Mass.; Paul G. Swiszcz, Boulder, Colo.; James M. Anthony, Denver, Colo.; and Jason T. Throne, Steamboat Springs, Colo.

Signed and Sealed this

Twenty-seventh Day of February, 2007

JON W. DUDAS
*Director of the United States Patent and Trademark Office*